(12) United States Patent
Machimura et al.

(10) Patent No.: US 7,697,605 B2
(45) Date of Patent: Apr. 13, 2010

(54) SIGNAL TRANSMITTING/RECEIVING SYSTEM AND METHOD, SIGNAL TRANSMITTING APPARATUS AND METHOD, SIGNAL PROCESSING APPARATUS AND METHOD, RECORDING MEDIUM, AND PROGRAM FOR TRANSMITTING/RECEIVING SIGNALS UNAFFECTED BY OTHER APPARATUSES

(75) Inventors: Masanori Machimura, Tokyo (JP); Masaaki Hattori, Chiba (JP); Hiroto Kimura, Tokyo (JP); Ryosuke Araki, Kanagawa (JP); Tetsujiro Kondo, Tokyo (JP); Takashi Tago, Tokyo (JP); Seiji Wada, Kanagawa (JP); Takashi Nakanishi, Tokyo (JP)

(73) Assignee: Sony Corporation, Tokyo (JP)

( * ) Notice: Subject to any disclaimer, the term of this patent is extended or adjusted under 35 U.S.C. 154(b) by 1061 days.

(21) Appl. No.: 11/190,458

(22) Filed: Jul. 26, 2005

(65) Prior Publication Data
US 2006/0023797 A1 Feb. 2, 2006

(30) Foreign Application Priority Data
Jul. 30, 2004 (JP) ............................ P2004-223618

(51) Int. Cl.
*H03K 7/04* (2006.01)
(52) U.S. Cl. .................... 375/239; 70/256; 340/426.13; 340/825.72; 341/176; 348/14.05; 348/114; 348/211.99; 348/734; 369/24.01; 381/315

(58) Field of Classification Search ................. 340/5.61, 340/825.72; 375/239; 398/182; 455/103
See application file for complete search history.

(56) References Cited

U.S. PATENT DOCUMENTS

| 5,877,702 A * | 3/1999 | Kohler .................. 340/825.72 |
| 6,701,094 B1* | 3/2004 | Radomsky et al. .......... 398/182 |
| 7,289,774 B2* | 10/2007 | Jorgensen .................. 455/103 |
| 2004/0070489 A1* | 4/2004 | Ueda et al. ................. 340/5.61 |

FOREIGN PATENT DOCUMENTS

JP 8294180 * 11/1996

* cited by examiner

*Primary Examiner*—David C Payne
*Assistant Examiner*—Adolf Dsouza
(74) *Attorney, Agent, or Firm*—K&L Gates LLP

(57) ABSTRACT

A signal transmitting/receiving system and method, signal transmitting apparatus and method, signal processing apparatus and method, recording medium, and program are provided. A signal transmitting/receiving system includes a transmitter configured to transmit signals; and a receiver configured to receive the signals transmitted from the transmitter. The transmitter transmits signals using a first signal having an edge at a position that is 1/n from the beginning of a unit segment and a second signal having an edge at a position of (n−1)/n from the beginning of a unit segment, where n is an integer greater than or equal to three, one of the first signal and the second signal representing logic "0" and the other representing logic "1". The receiver determines a signal type based on a length of an edge interval of either rising edges or falling edges of the signals received.

35 Claims, 28 Drawing Sheets

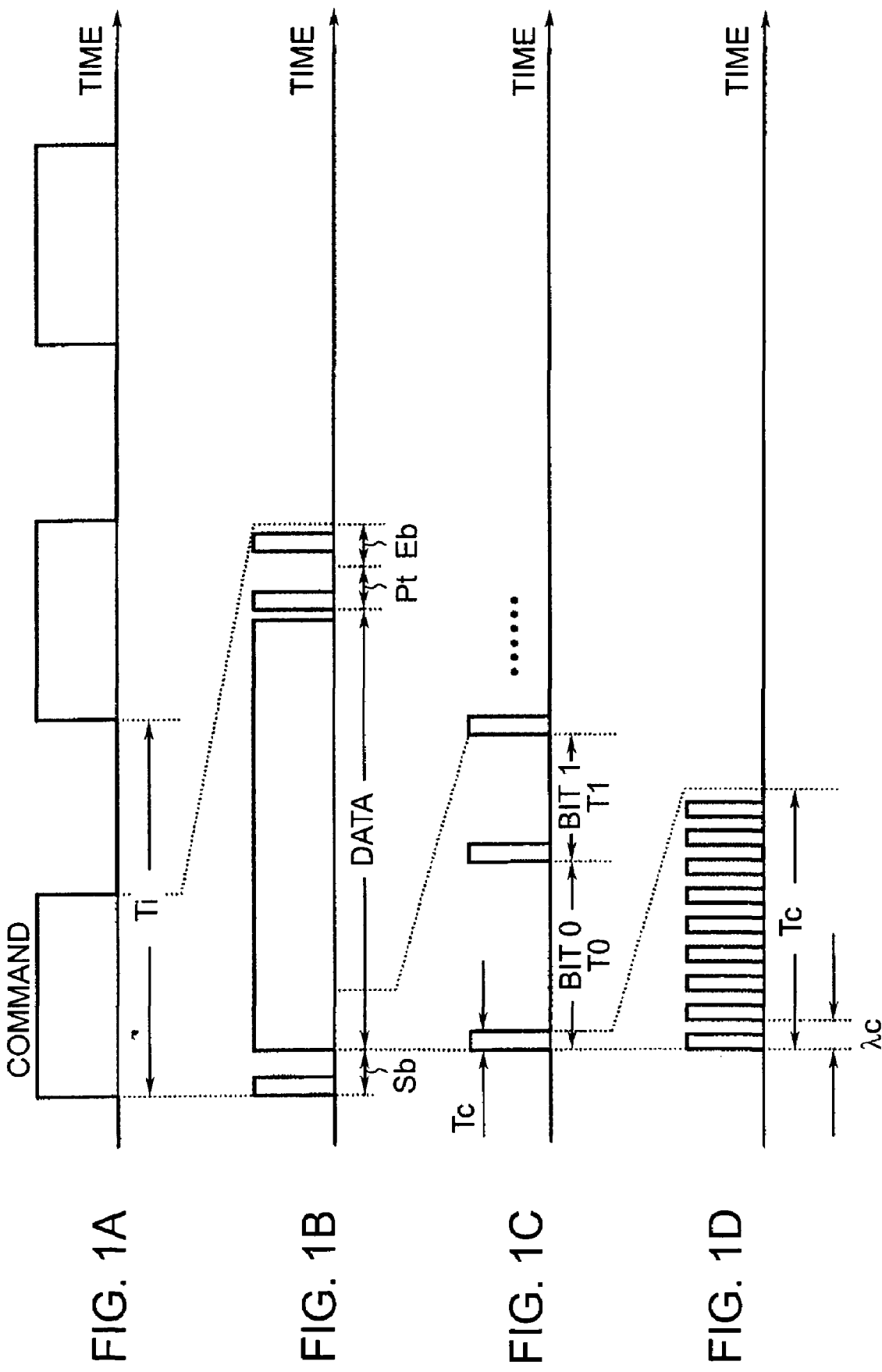

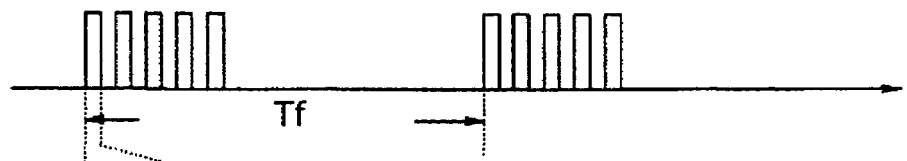
FIG. 2A
FIG. 2B
FIG. 3
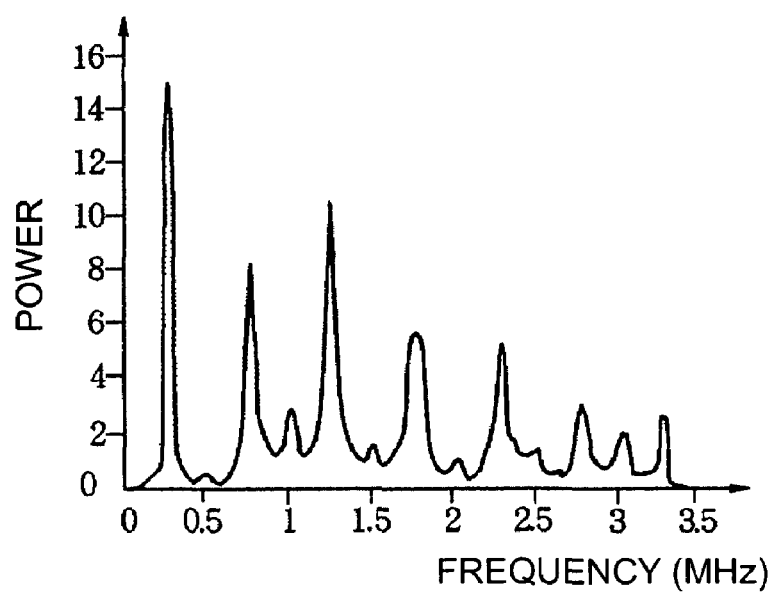

FIG. 4
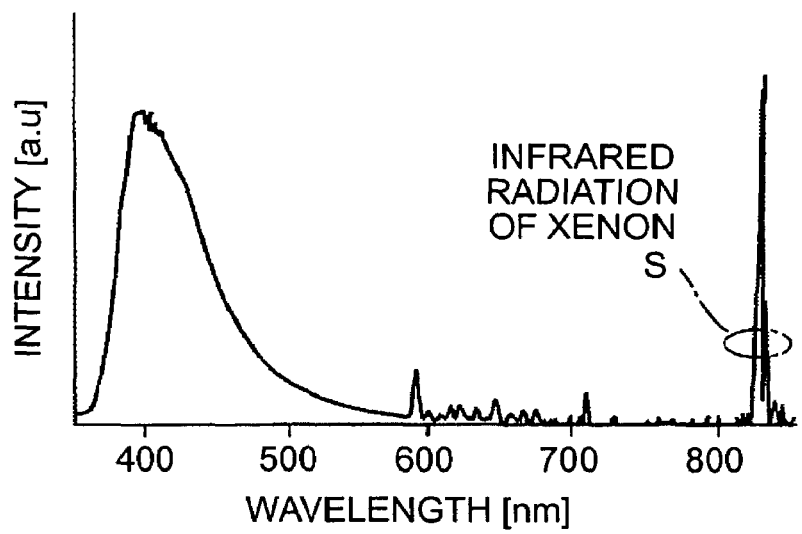
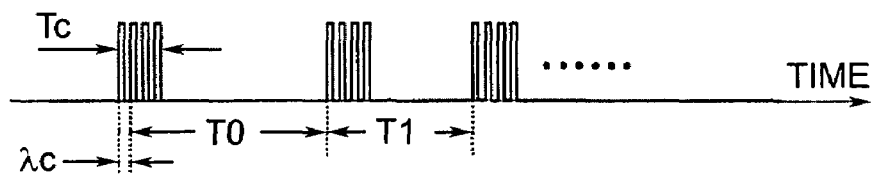
FIG. 5A
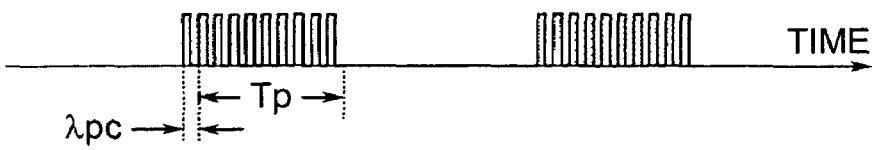
FIG. 5B
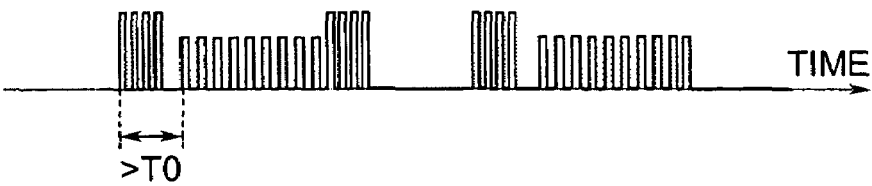
FIG. 5C

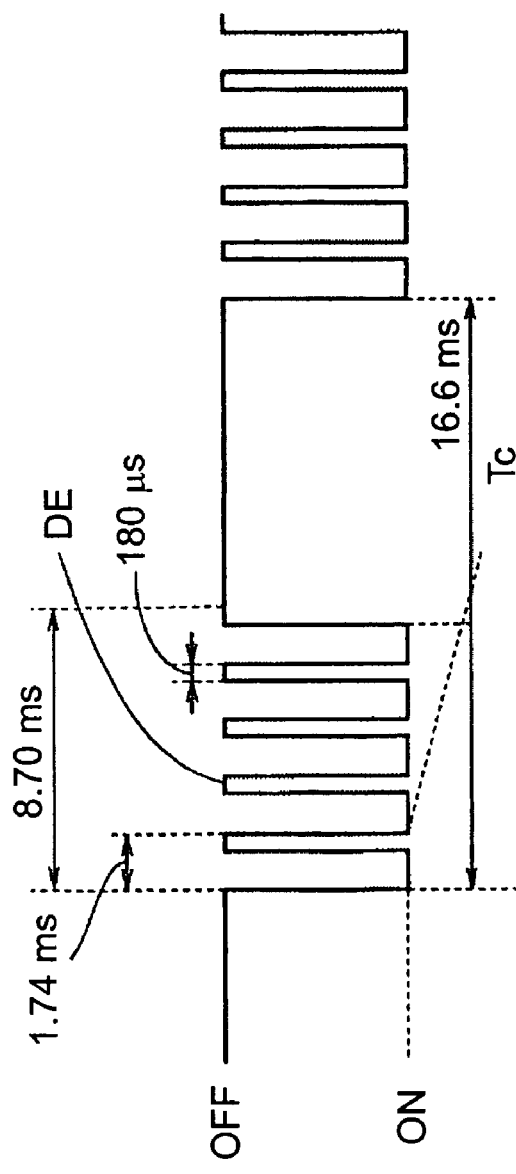
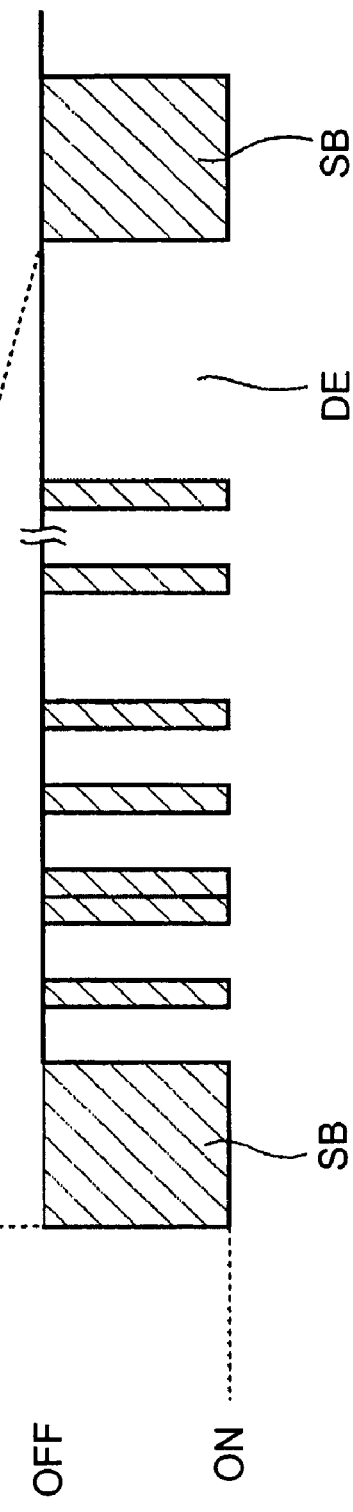
FIG. 18A
FIG. 18B

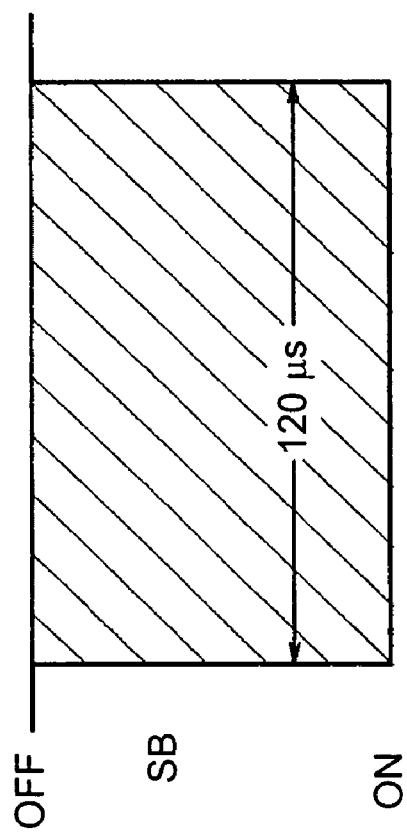
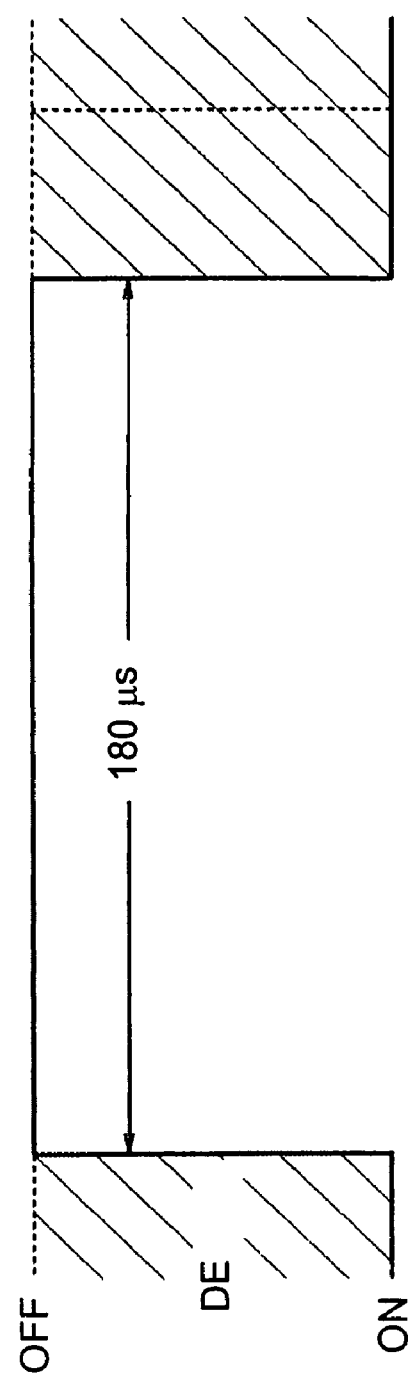
FIG. 19A
FIG. 19B

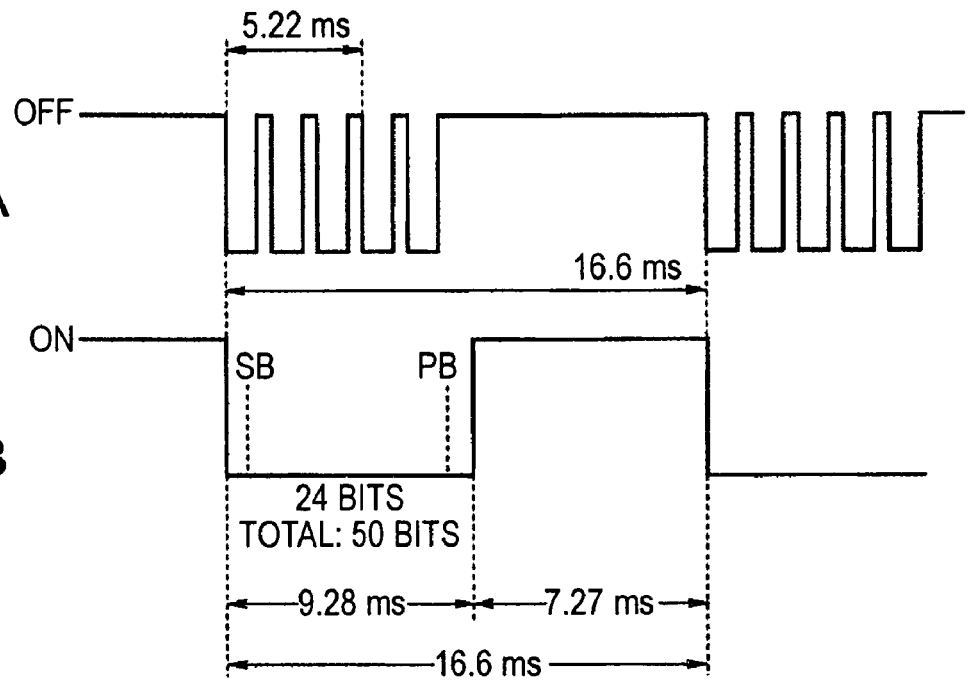
FIG. 21A
FIG. 21B
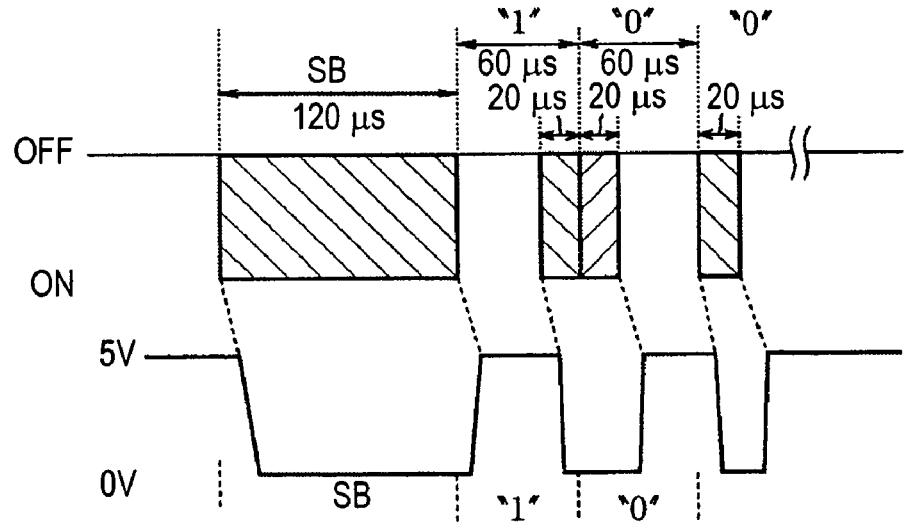
FIG. 22A
FIG. 22B

SIGNAL TRANSMITTING/RECEIVING SYSTEM AND METHOD, SIGNAL TRANSMITTING APPARATUS AND METHOD, SIGNAL PROCESSING APPARATUS AND METHOD, RECORDING MEDIUM, AND PROGRAM FOR TRANSMITTING/RECEIVING SIGNALS UNAFFECTED BY OTHER APPARATUSES

CROSS REFERENCES TO RELATED APPLICATIONS

The present application claims priority to Japanese Patent Application JP 2004-223618, filed in the Japanese Patent Office on Jul. 30, 2004, the entire contents of which being incorporated herein by reference.

BACKGROUND

The present invention relates to signal transmitting/receiving systems and methods, signal transmitting apparatuses and methods, signal processing apparatuses and methods, recording media, and programs. Particularly, the present invention relates to a signal transmitting/receiving system and method, a signal transmitting apparatus and method, a signal processing apparatus and method, a recording medium, and a program that allow signals to be transmitted/received quickly and reliably without being affected by other electronic apparatuses.

Television receivers that are currently used have attached remote controllers so that users can input various instructions by operating the remote controllers.

FIGS. 1A to 1D are timing charts of remote control signals generated by a remote controller. As shown in FIG. 1A, a command is output three times in total by a rate of once per each command interval Ti. The command interval Ti corresponds to the period of one field of a television receiver, i.e., 1/60 second in the case of NTSC.

As shown in FIG. 1B, a start bit Sb is disposed at the beginning of the command, and an end bit Eb is disposed at the end of the command. Between the start bit Sb and the end bit Eb, data and parity Pt are disposed.

The data is binary data composed of bits representing logic "0" or logic "1". As shown in FIG. 1C, logic "0" is represented by a signal having a length of time T0, and logic "1" is represented by a signal having a length of time T1. As shown in FIG. 1D, a carrier having a length of a carrier time Tc is disposed at the beginning of a bit.

The frequency of the carrier has hitherto been 38 kHz to 40 kHz. However, for example, in order to quickly move a cursor on a television screen, a frequency of 455 kHz has recently been proposed.

FIG. 2A shows driving signals of a plasma display (PDP). Referring to FIG. 2A, by a period of a field time Tf, pulses are supplied during a predetermined period in the field time Tf. The brightness is increased as the number of pulses is increased. As shown in FIG. 2B, each of the pulses is composed of a carrier having a length of a carrier pulse time Tp and a frequency of 250 kHz.

FIG. 3 shows the frequency spectrum of the driving signals for the plasma display, shown in FIGS. 2A and 2B. The spectrum has a fundamental frequency of 250 kHz and odd harmonic components.

FIG. 4 shows the spectrum of electroluminescence of the plasma display. The plasma display performs fluorescence emission by ultraviolet rays having wavelengths in the vicinity of 400 nm, so that it generates parasitic emissions having wavelengths of 850 nm or longer, as shown in FIG. 4.

Thus, for example, when a remote control signal represented by a binary code composed of a combination of time T0 and time T1 is generated in the proximity of a plasma display as shown in FIG. 5A, if parasitic emissions of the plasma display occur substantially at the same timing as shown in FIG. 5B, the parasitic emission components of the plasma display are superposed on the remote control signal as shown in FIG. 5C, so that the remote control signal is interfered with. As a result, although a binary code of logic "0" and logic "1" is supposed to be represented by time T0 and T1, for example, the length of time T0 representing logic "0" is detected to be shorter than its actual length, as shown in FIG. 5C. This inhibits the bit from being recognized as logic "0". This problem similarly occurs for logic "1".

This indicates that the use of the remote controller is inhibited in the proximity of the plasma display.

In view of this problem, for example, according to techniques proposed in Japanese Unexamined Patent Application Publication No. 8-294180, a remote controller is physically connected to a plasma display via an optical fiber so that remote control signals are fed to the plasma display via the optical fiber.

However, when a remote controller is connected to a plasma display via an optical fiber as described in Japanese Unexamined Patent Application Publication No. 8-294180, the range where the use of the remote controller is allowed is restricted, and the optical fiber can be an obstacle. This causes inconvenience in living environment.

SUMMARY

It is desired that a remote controller can be used at an arbitrary position even in the proximity of a plasma display.

A signal transmitting/receiving system according to an embodiment of the present invention includes a transmitter configured to transmit signals; and a receiver configured to receive the signals transmitted from the transmitter. The transmitter transmits signals using a first signal having an edge at a position that is 1/n from the beginning of a unit segment and a second signal having an edge at a position of (n−1)/n from the beginning of a unit segment, where n is an integer greater than or equal to three, one of tie first signal and the second signal representing logic "0" and the other representing logic "1". The receiver determines a signal type based on a length of an edge interval of either rising edges or falling edges of the signals received.

A signal transmitting/receiving method according to another embodiment of the present invention is a signal transmitting/receiving method for a signal transmitting/receiving system including a transmitter configured to transmit signals and a receiver configured to receive the signals transmitted from the transmitter. The signal transmitting/receiving method includes the steps of transmitting signals by the transmitter, using a first signal having an edge at a position that is 1/n from the beginning of a unit segment and a second signal having an edge at a position of (n−1)/n from the beginning of a unit segment, where n is an integer greater than or equal to three, one of the first signal and the second signal representing logic "0" and the other representing logic "1"; and determining, by the receiver, a signal type based on a length of an edge interval of either rising edges or falling edges of the signals received.

A signal transmitting apparatus according to another embodiment of the present invention includes generating means for generating data to transmit; modulating means for modulating a carrier based on the data generated; and transmitting means for transmitting the carrier modulated. The generating means generates the data using a first signal having an edge at a position that is 1/n from the beginning of a unit segment and a second signal having an edge at a position of (n−1)/n from the beginning of a unit segment, where n is an integer greater than or equal to three, one of the first signal and the second signal representing logic "0" and the other representing logic "1".

The generating means may generate a signal having substantially twice a length of one unit segment as a start signal, and a signal having substantially three times the length of one unit segment as an end signal.

The generating means may generate the same data an odd number of times in a predetermined command segment, the odd number of times being not less than three times.

The modulating means may output the carrier during periods of a first level while not outputting the carrier during periods of a second level.

The transmitting means may transmit the carrier as an infrared signal for remote-controlling an electronic apparatus.

A signal transmitting method according to another embodiment of the present invention includes the steps of generating data to transmit; modulating a carrier based on the data generated; and transmitting the carrier modulated. The generating step generates the data using a first signal having an edge at a position that is 1/n from the beginning of a unit segment and a second signal having an edge at a position of (n−1)/n from the beginning of a unit segment, where n is an integer greater than or equal to three, one of the first signal and the second signal representing logic "0" and the other representing logic "1".

A recording medium according to another embodiment of the present invention has recorded thereon a computer-readable program. The program includes the steps of generating data to transmit; modulating a carrier based on the data generated; and transmitting the carrier modulated. The generating step generates the data using a first signal having an edge at a position that is 1/n from the beginning of a unit segment and a second signal having an edge at a position of (n−1)/n from the beginning of a unit segment, where n is an integer greater than or equal to three, one of the first signal and the second signal representing logic "0" and the other representing logic "1".

A program according to another embodiment of the present invention is executed by a computer. The program includes the steps of generating data to transmit; modulating a carrier based on the data generated; and transmitting the carrier modulated. The generating step generates the data using a first signal having an edge at a position that is 1/n from the beginning of a unit segment and a second signal having an edge at a position of (n−1)/n from the beginning of a unit segment, where n is an integer greater than or equal to three, one of the first signal and the second signal representing logic "0" and the other representing logic "1".

A signal processing apparatus according to another embodiment of the present invention includes obtaining means for obtaining signals; edge detecting means for detecting edges of the signals obtained; interval detecting means for detecting an edge interval corresponding to an interval between either rising edges or falling edges detected; length determining means for determining a length of the edge interval detected; and type determining means for determining a signal type based on the length of the edge interval detected.

The type determining means may determine a start signal and a type of a data signal immediately succeeding the start signal based on the length of the edge interval.

The type determining means may determine a type of a next data signal based on the length of the edge interval and a type of a data signal immediately preceding the edge interval.

The type determining means may determine an end signal and a type of a data signal immediately preceding the end signal based on the length of the edge interval and a type of a data signal immediately preceding the edge interval.

The edge detecting means may detect either edges of transition from a first level to a second level or edges of transition from the second level to the first level in signals composed of a first data signal having an edge at a position that is 1/n from the beginning of a unit segment and a second data signal having an edge at a position of (n−1)/n from the beginning of a unit segment, where n is an integer greater than or equal to three.

The signal processing apparatus may further include receiving means for receiving infrared signals transmitted for remote control; and processing means for executing processing corresponding to the signal type determined. In this case, the obtaining means obtains signals that are based on the infrared signals received by the receiving means.

The receiving means may receive infrared signals for remote-controlling display on a plasma display. In this case, the processing means controls the display on the plasma display.

A signal processing method according to another embodiment of the present invention includes the steps of obtaining signals; detecting edges of the signals obtained; detecting an edge interval corresponding to an interval between either rising edges or falling edges detected; determining a length of the edge interval detected; and determining a signal type based on the length of the edge interval detected.

A recording medium according to another embodiment of the present invention has recorded thereon a computer-readable program. The program includes the steps of obtaining signals; detecting edges of the signals obtained; detecting an edge interval corresponding to an interval between either rising edges or falling edges detected; determining a length of the edge interval detected; and determining a signal type based on the length of the edge interval detected.

A program according to another embodiment of the present invention is executed by a computer. The program includes the steps of obtaining signals; detecting edges of the signals obtained; detecting an edge interval corresponding to an interval between either rising edges or falling edges detected; determining a length of the edge interval detected; and determining a signal type based on the length of the edge interval detected.

According to these embodiments of the present invention, a transmitter transmits signals using a first signal having an edge at a position that is 1/n from the beginning of a unit segment and a second signal having an edge at a position of (n−1)/n from the beginning of a unit segment, where n is an integer greater than or equal to three, one of the first signal and the second signal representing logic "0" and the other representing logic "1". The receiver determines a signal type based on a length of an edge interval of either rising edges or falling edges of the signals received.

Furthermore, according to these embodiments of the present invention, a carrier that is transmitted is modulated based on data generated using a first signal having an edge at a position that is 1/n from the beginning of a unit segment and a second signal having an edge at a position of (n−1)/n from the beginning of a unit segment, where n is an integer greater than or equal to three, one of the first signal and the second signal representing logic "0" and the other representing logic "1".

Furthermore, according to these embodiments of the present invention, an edge interval corresponding to an interval between either rising edges or falling edges detected from signals obtained is detected, and a signal type is determined based on a length of the edge interval detected.

Additional features and advantages are described herein, and will be apparent from, the following Detailed Description and the figures.

BRIEF DESCRIPTION OF THE FIGURES

FIGS. 1A to 1D are timing charts of a remote control signal according to the related art.

FIGS. 2A and 2B are diagrams for explaining parasitic emissions by a plasma display.

FIG. 3 is a diagram showing frequency components of the parasitic emissions by the plasma display.

FIG. 4 is a diagram showing the spectrum of electroluminescence of the plasma display.

FIGS. 5A to 5C are timing charts for explaining interference due to the parasitic emissions by the plasma display.

FIGS. 18A and 18B are diagrams showing a command interval and a signal format according to an embodiment of the present invention.

FIGS. 19A and 19B are diagrams showing a start bit and a data end;

FIGS. 21A and 21B are diagrams for explaining a ratio of a transmission signal in a command interval.

FIGS. 22A and 22B are diagrams showing a transmitted infrared signal and a corresponding received signal.

DETAILED DESCRIPTION

The present invention relates to signal transmitting/receiving systems and methods, signal transmitting apparatuses and methods, signal processing apparatuses and methods, recording media, and programs. Particularly, the present invention relates to a signal transmitting/receiving system and method, a signal transmitting apparatus and method, a signal processing apparatus and method, a recording medium, and a program that allow signals to be transmitted/received quickly and reliably without being affected by other electronic apparatuses.

Figure 6:
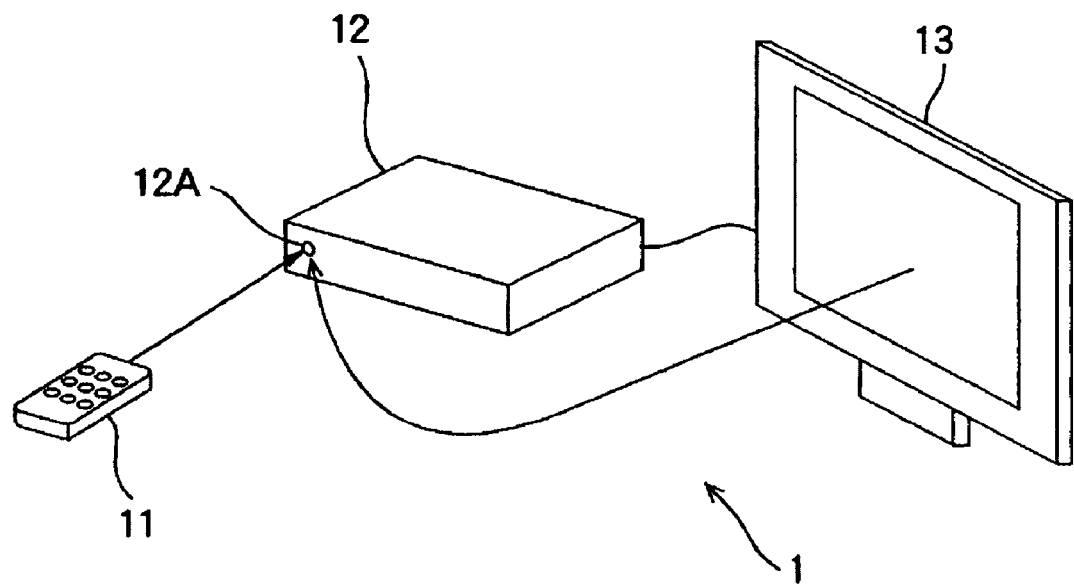
FIG. 6 is a perspective view showing an example configuration of a signal transmitting/receiving system according to an embodiment of the present invention.

Now, embodiments of the present invention will be described with reference to the drawings. FIG. 6 shows an example configuration of a signal transmitting/receiving system according to an embodiment of the present invention. A signal transmitting/receiving system 1 includes a remote controller 11, a television tuner 12, and a plasma display 13. The remote controller 11, when it is operated by a user, outputs an infrared remote control signal corresponding to the key operated toward the television tuner 12 as a controlled apparatus. The television tuner 12 includes a receiver 12A for receiving infrared signals. The television tuner 12 receives the remote control signal fed from the remote controller 11, and executes processing corresponding to the signal. The plasma display 13 displays an image based on signals fed from the television tuner 12.

In some cases, the receiver 12A of the television tuner 12 receives parasitic emissions generated by the plasma display 13.

Figure 7:
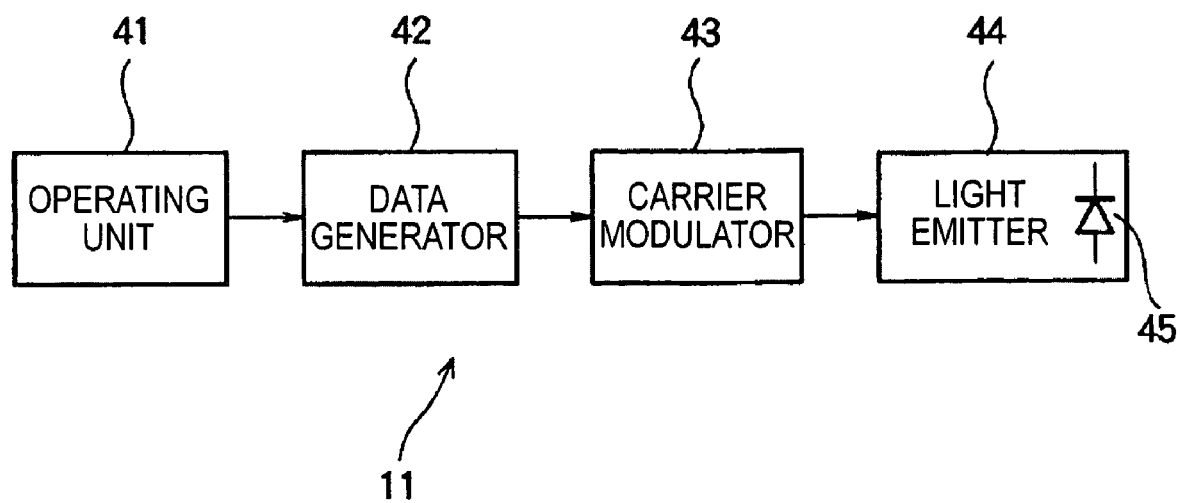
FIG. 7 is a block diagram showing an example functional configuration of a remote controller shown in FIG. 6.

The remote controller 11 includes, for example, an operating unit 41, a data generator 42, a carrier modulator 43, and a light emitter 44, as shown in FIG. 7. The light emitter 44 includes a light-emitting element 45 for generating infrared rays.

The operating unit 41 includes various types of keys, and it outputs a signal corresponding to the key operated by the user to the data generator 42. The data generator 42 generates data corresponding to the signal input from the operating unit 41, i.e., data corresponding to the key operated by the user, and outputs the data to the carrier modulator 43. The carrier modulator 43 modulates a carrier having a predetermined frequency (455 kHz in this embodiment) based on the data fed from the data generator 42, and outputs the modulated signal to the light emitter 44. The light emitter 44, by the light-emitting element 45 thereof, generates an infrared signal as a remote control signal based on the signal fed from the carrier modulator 43.

Figure 8:
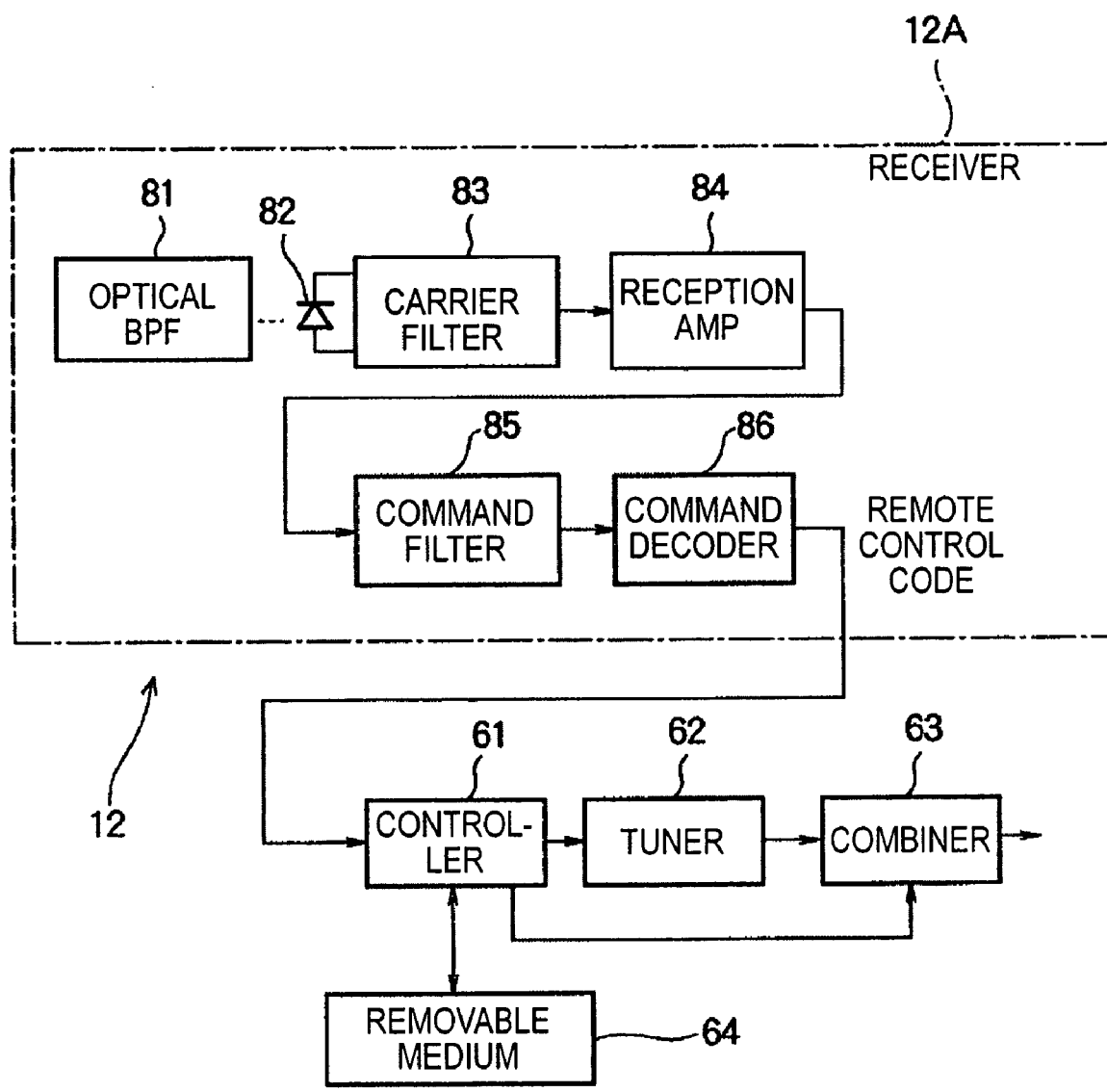
FIG. 8 is a block diagram showing an example configuration of a television tuner shown in FIG. 6.

FIG. 8 shows an example configuration of the television tuner 12. The television tuner 12 includes the receiver 12A, a controller 61, a tuner 62, a combiner 63, and a removable medium 64.

The receiver 12A includes an optical bandpass filter (BPF) 81, a photoreceptor element 82, a carrier filter 83, a reception amp 84, a command filter 85, and a command decoder 86.

The optical bandpass filter 81 extracts only components of wavelengths in a specific range from the infrared signal input thereto, and outputs the components extracted to the photoreceptor element 82. The photoreceptor element 82 converts the infrared signal cast thereon via the optical bandpass filter 81 into an electric signal, and outputs the electric signal to the carrier filter 83. The carrier filter 83 extracts from the signal input from the photoreceptor element 82 a component of the carrier frequency (455 kHz in this embodiment) of the infrared signal output from the remote controller 11, and outputs the component extracted to the reception amp 84. The reception amp 84 amplifies the signal input from the carrier filter 83, and outputs the amplified signal to the command filter 85. The command filter 85 extracts a command component from the signal input from the reception amp 84, and outputs the command component to the command decoder 86. The command decoder 86 decodes the command input from the command filter 85, thereby generating a remote control code.

The controller 61 is implemented, for example, by a microcomputer. The controller 61 receives input of the remote control code output by the command decoder 86, analyzes the content of the remote control code, and executes processing corresponding to the content. For example, the controller 61 controls the tuner 62 so that radio waves of a broadcasting channel specified by the user are demodulated. Signals output from the tuner 62 are output to the plasma display 13 via the combiner 63, whereby a corresponding image is displayed. The combiner 63 combines image data of a cursor or the like, input by the controller 61, with video signals input from the tuner 62.

The removable medium 64 is connected to the controller 61 as needed, and it supplies computer programs, data, and so forth to the controller 61 as needed.

Figure 9:
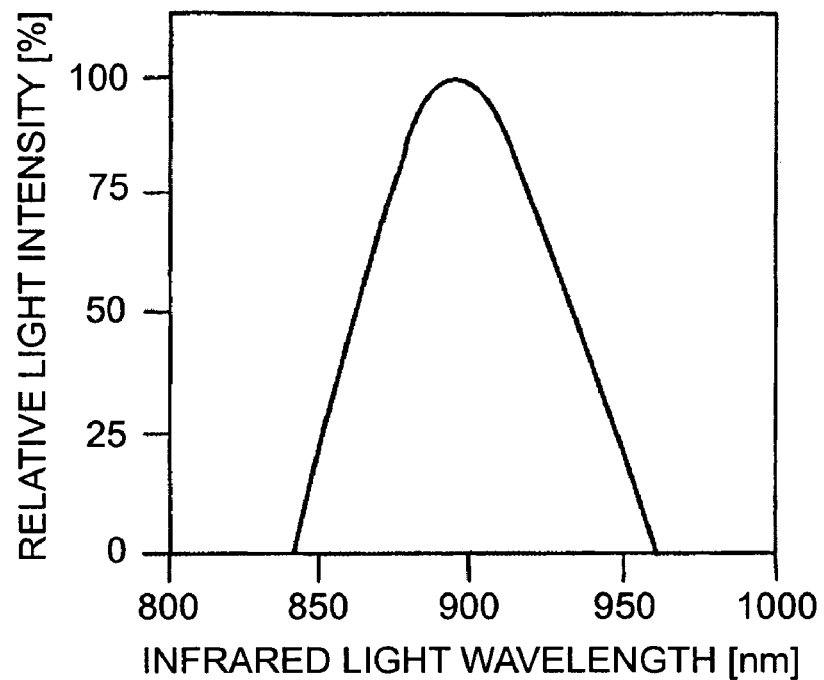
FIG. 9 is a graph showing emission characteristics of a light-emitting element shown in FIG. 7.
Figure 10:
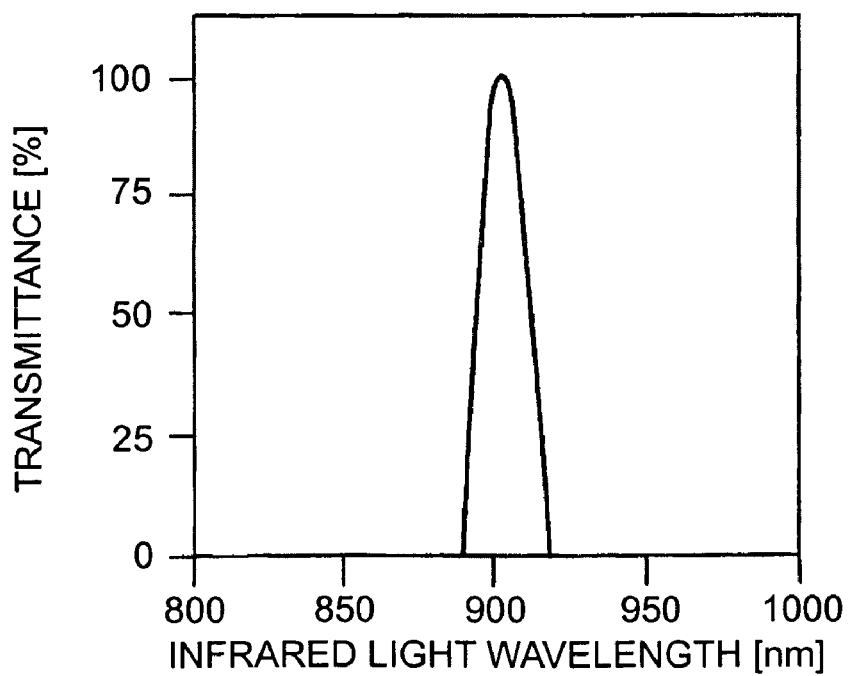
FIG. 10 is a graph showing transmission characteristics of an optical bandpass filter shown in FIG. 8.
Figure 11:
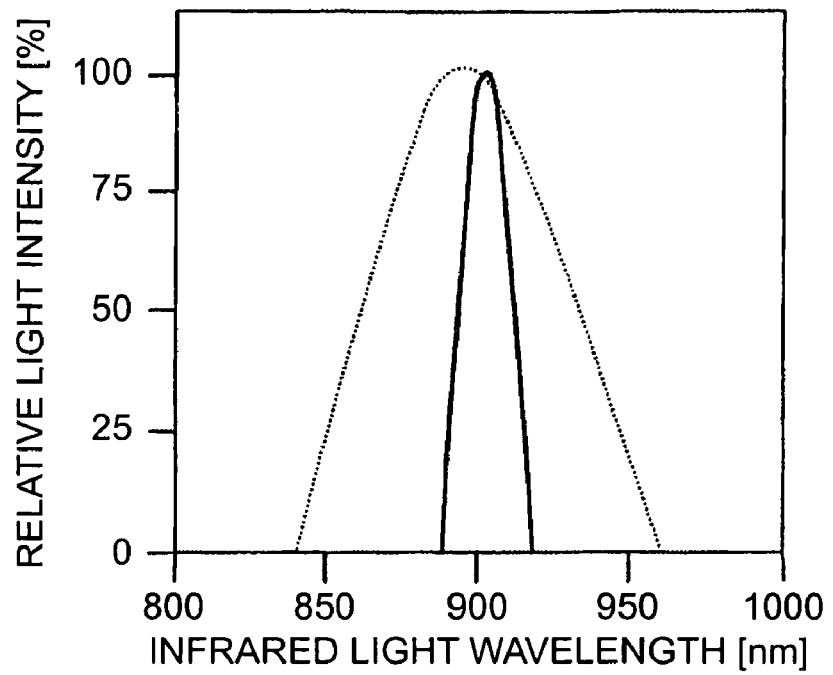
FIG. 11 is a graph showing output characteristics of the optical bandpass filter shown in FIG. 8.

FIG. 9 shows wavelength characteristics of the light-emitting element 45 of the light emitter 44. In this embodiment, the light-emitting element 45 generates infrared rays having wavelengths in a range of 840 nm to 960 nm with a peak approximately at 890 nm. The optical bandpass filter 81 transmits only light having wavelengths in a range of 890 nm to 920 nm having a peak approximately at 900 nm, as shown in FIG. 10. Thus, as shown in FIG. 11, of the infrared signal output from the light-emitting element 45 of the light emitter 44 (the signal indicated by a broken line in FIG. 11), only components in accordance with the characteristics of the optical bandpass filter 81 shown in FIG. 10 are extracted.

Figure 12:
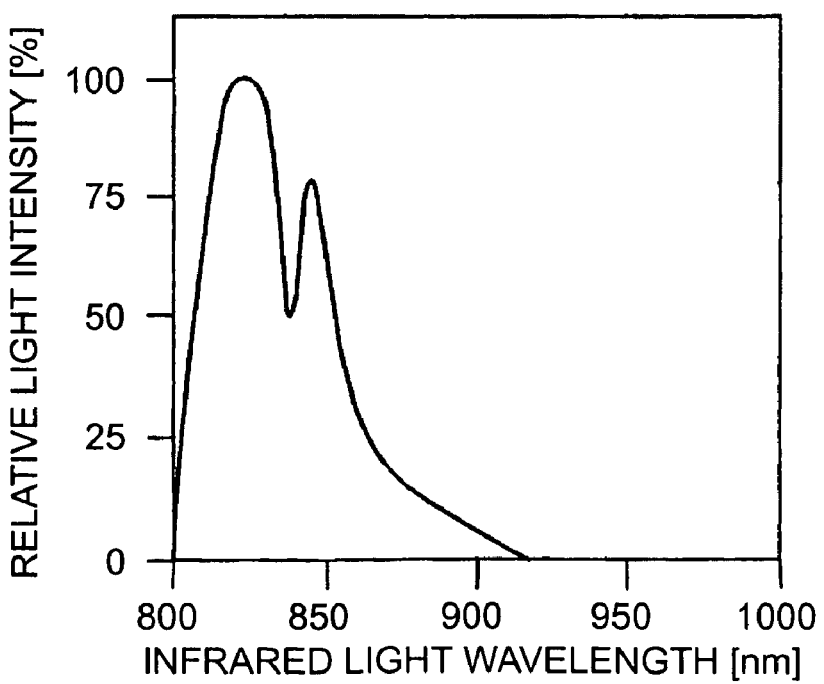
FIG. 12 is a graph showing infrared emission characteristics of the plasma display.
Figure 13:
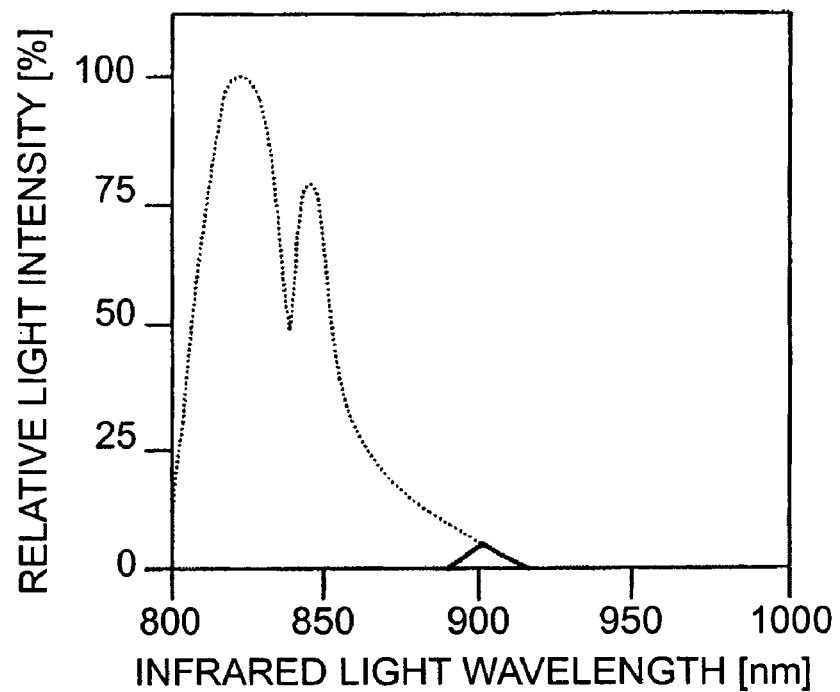
FIG. 13 is a graph showing transmission characteristics of the optical bandpass filter regarding infrared rays generated by the plasma display.

The plasma display 13 generates infrared rays having wavelengths in a range of 800 nm to 920 nm as parasitic emissions, as shown in FIG. 12. However, since the optical bandpass filter 81 has the characteristics shown in FIG. 10, even if the parasitic emissions generated by the plasma display 13 are received, the components that transmit through the optical bandpass filter 81 and reach the photoreceptor element 82 are sufficiently smaller compared with the components output by the light-emitting element 45 of the remote controller 11 shown in FIG. 11, as indicated by a solid line in FIG. 13. Thus, interference by the parasitic emission components of the plasma display 13 is suppressed.

Figure 14:
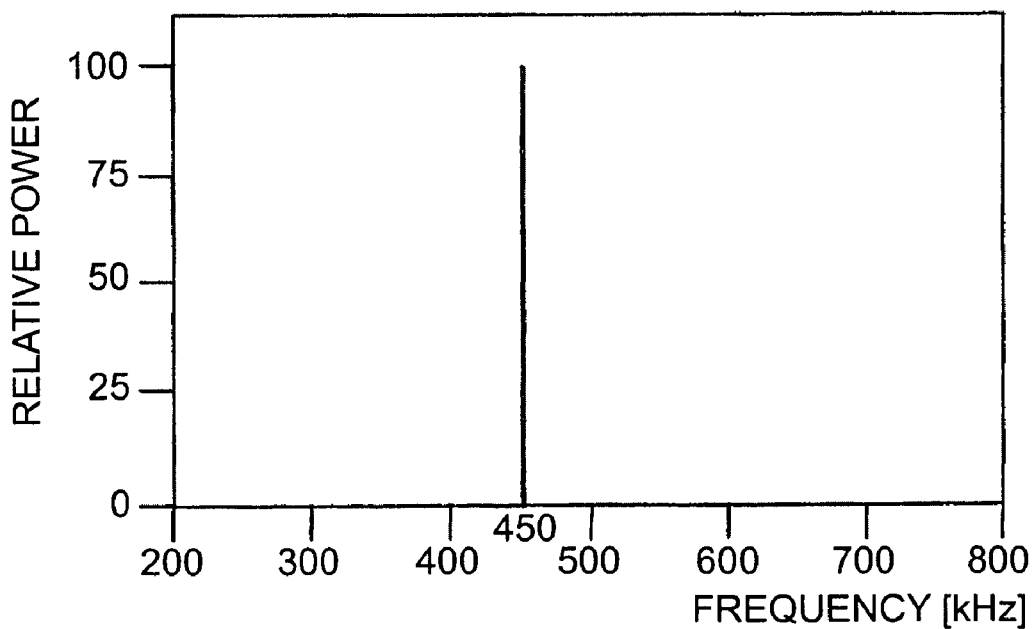
FIG. 14 is a graph showing frequency characteristics of a carrier of a remote control signal.
Figure 15:
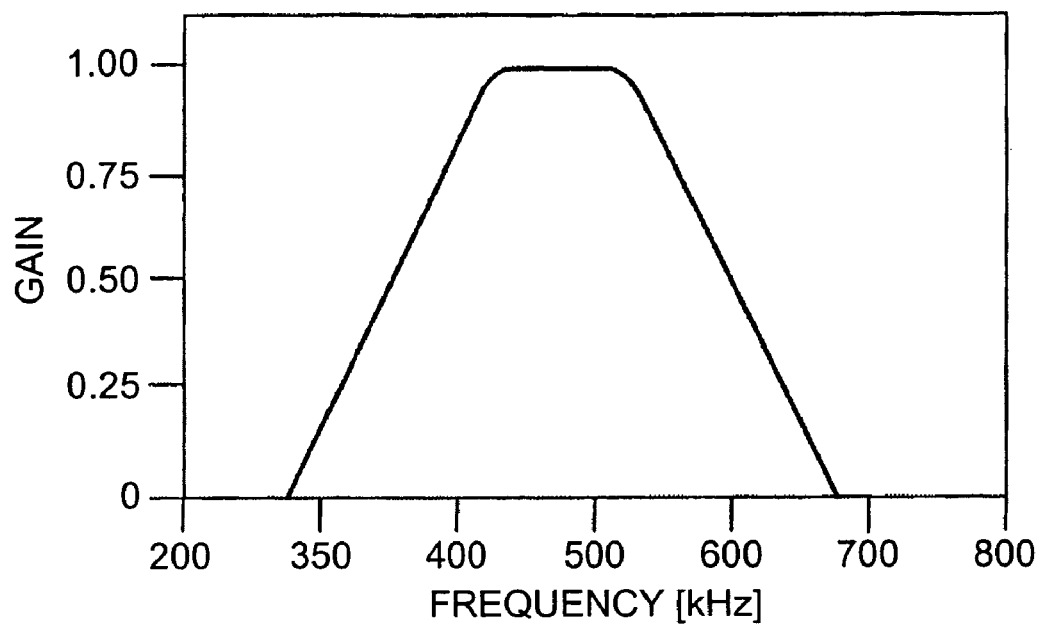
FIG. 15 is a graph showing transmission characteristics of a carrier filter shown in FIG. 8.
Figure 16:
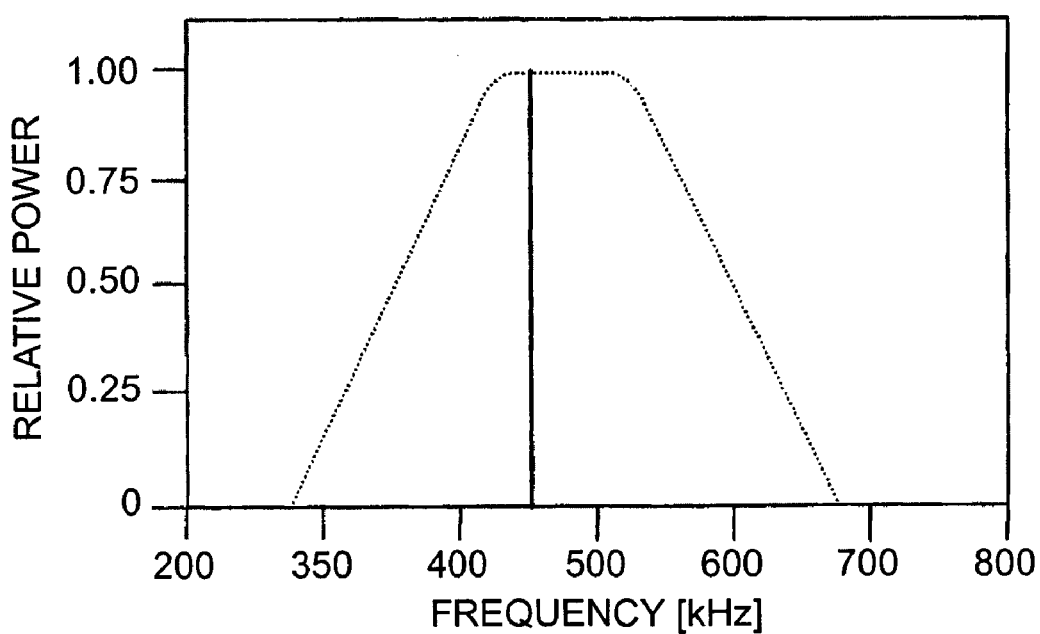
FIG. 16 is a graph showing output characteristics of the carrier filter shown in FIG. 8.

The frequency of the carrier generated by the carrier modulator 43 of the remote controller 11 is a single frequency of 455 kHz, as shown in FIG. 14. The frequency characteristics of the carrier filter 83 are such that components in a range of 280 kHz to 680 kHz, centered about a range of 430 kHz to 520 kHz (with a gain of 1), are transmitted, as shown in FIG. 15. Thus, the carrier filter 83 transmits the carrier component of the remote controller 11, as shown in FIG. 16. Thus, the component is amplified by the reception amp 84, and the amplified component is fed to the command filter 85.

Figure 17:
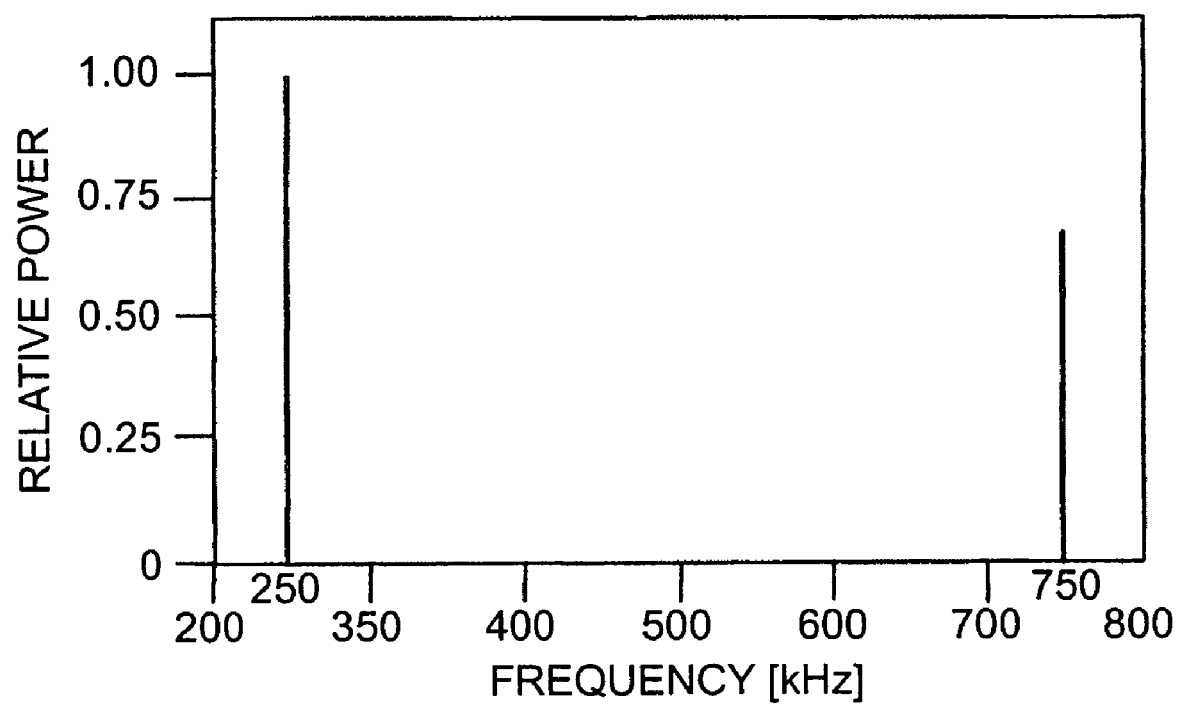
FIG. 17 is a graph showing frequency characteristics of a carrier of the plasma display.

The frequency characteristics of the carrier of the plasma display 13 have a carrier frequency of 250 kHz and a harmonic component of 750 kHz, as shown in FIG. 17. The parasitic emission components generated by the plasma display 13 do not transmit through the carrier filter 83. Also for this reason, the interference on the remote control signal by the plasma display 13 is suppressed.

FIGS. 18A and 18B show timing charts of infrared signals generated by the remote controller 11. The data generator 42 generates data of five packets during a command interval Tc of 16.6 ms. Each of the five packets includes the same command. In this embodiment, a command for one frame is formed by the five packets. The length of each packet is 1.74 ms. At the end of each packet, a no-signal segment having a length of 180 μs is disposed. In FIGS. 18A and 18B, periods of a level shown on the upper side are periods when signals are off (no signals), and periods of a level shown on the lower side are periods when signals are on (signals are present).

The carrier modulator 43 generates a carrier in accordance with data while data is ON. As shown in FIG. 18B, a start bit SB is disposed at the beginning of each packet, and a data end DE is disposed at the end of each packet. Between the start bit SB and the data end DE, binary codes representing logic "1" or logic "0" are disposed. In FIG. 18B, the carrier is generated during the periods of the level shown on the lower side (periods hatched in FIG. 18B), and the carrier is not generated during the periods of the level shown on the upper side (periods not hatched in FIG. 18B).

Figure 20A:
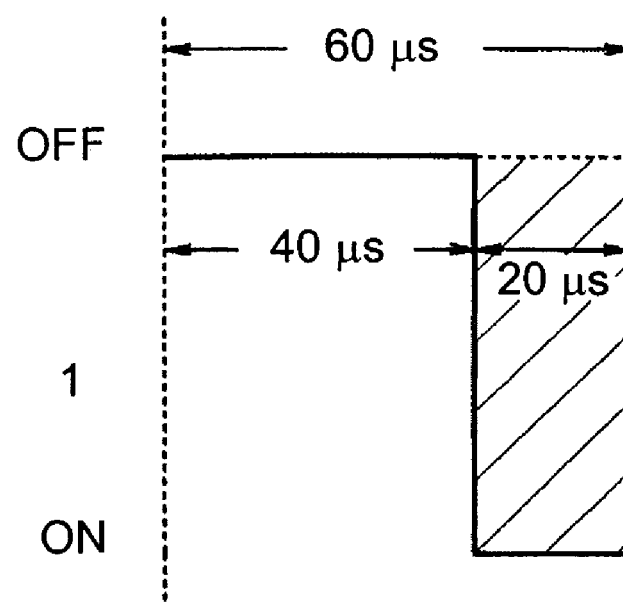
FIGS. 20A and 20B are diagrams showing binary codes of logic "1" and logic "0".
Figure 20B:
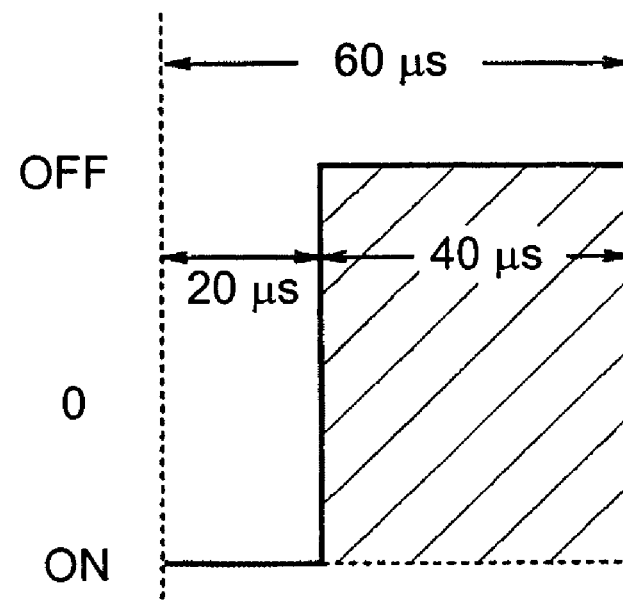

In this embodiment, the start bit SB has a length of 120 μs (twice the length 60 μs of a unit segment of binary code, described later with reference to FIGS. 20A and 20B), as shown in FIG. 19A. That is, in the start bit SB, the carrier is generated for a period of 120 μs.

A no-carrier period having a length of 180 μs (three times the length of a unit segment) serves as a data end DE, as shown in FIG. 19B. However, the timing of occurrence of next data after the data end DE is arbitrary, so that a non-carrier period of an arbitrary length may follow after the period of 180 μs.

The binary code of logic "1" or logic "0" is represented by a unit segment having a length of 60 μs. The logic "1" is represented by a no-carrier period of 40 μs associated with the leading edge of a unit segment of 60 μs, followed by a carrier period of 20 μs, as shown in FIG. 20A. That is, logic "1" is represented by an OFF period (a period of the second level) of 40 μs, a falling edge from the second level to the first level, and an ON period (a period of the first level) of 20 μs.

On the other hand, logic "0" is represented by a no-carrier segment (a segment of the first level) of 20 μs, a rising edge from the first level to the second level, and a carrier segment (a segment of the second level) of 40 μs.

In this embodiment, the start bit SB has twice the length of a unit segment, and the data end DE has three times the length of a unit segment. However, each of the lengths may be a greater integer multiple of a unit segment. The length of the start bit SB and the length of the data end DE may be non-integer multiples of a unit segment. In that case, however, it becomes difficult to detect the start bit SB or the data end DE. Thus, integer multiples of a unit segment are preferred.

In this embodiment, the number of bits of data in one packet is 24 bits. However, the number of bits may be 16 bits or other arbitrary numbers of bits.

In this embodiment, an apparatus at the receiving end executes processing corresponding to packets received when three out of five packets are correctly received (i.e., when commands in three packets are the same). When the number of packets correctly received is two or less (i.e., when only two or less packets include the same command), the command is ignored at the receiving end. Thus, in this embodiment, the ratio of transmission signals in one field for correctly transmitting a command to the receiving end is 31.4%, as expressed in the following equation.

5.22 ms/16.6 ms=31.4%

In the above equation, 5.22 ms corresponds to the length of signals of three packets, and 16.6 ms corresponds to the length of one field (a command interval), as shown in FIG. 21A.

When one command is transmitted in a command interval Ti of one field, as shown in FIGS. 1A to 1D, the ratio of transmission signals in the field is 55.9% at maximum and 40.4% at minimum, as expressed in the following equation.

9.28 ms/16.6 ms=55.9%

6.7 ms/16.6 ms=40.4%

In the above calculations, it is assumed that the entire data is 50 bits, of which one bit is the start bit SB, 24 bits are data, and the other 25 bits are parity bits PB, as shown in FIG. 21B.

The start bit SB has a total length of 237.4 μs including a carrier segment having a length of 44.0 μs and a no-carrier segment having a length of 193.4 μs. Logic "1" has a total length of 184.6 μs including a carrier segment having a length of 44.0 μs and a no-carrier segment having a length of 140.6 μs. Logic "0" has a total length of 131.9 μs including a carrier segment having a length of 44.0 μs and a no-carrier segment having a length of 87.9 μs.

In this case, the length of the period of 50 bits differs depending on whether the bits are composed of logic "1" or logic "0". The length is a maximum of 9.28 ms (=237.4 μs+184.6 μs×49) when all the bits other than the start bit SB are 1. On the other hand, the length is a minimum of 6.7 ms (=237.4 μs+131.9 μs×49) when all the bits other than the start bit SB are 0.

That is, the time taken to transmit signals is shorter in this embodiment, so that noise tolerance is improved.

Thus, in this embodiment, as shown in FIG. 22A, the carrier having a frequency of 450 kHz is transmitted in the start bit SB. In the data segment, the carrier is transmitted during a period of 20 μs associated with the trailing end of a unit segment of 60 μs when the data is logic "1", and the carrier is transmitted during a period of 20 μs associated with the leading end of a unit segment of 60 μs when the data is logic "0". At the receiving end, as shown in FIG. 22B, activation occurs when the carrier is received, and the type of data received is determined. In FIG. 22B, the waveform at the receiving end is shown with consideration of time delay for demodulation.

Now, the principles for determining the type of data will be described. In subsequent figures, time delay for demodulation is disregarded.

The signal type is determined based on the interval of either rising edges or falling edges of a demodulated remote control signal (falling edges in this embodiment). That is, the data type is determined based on the interval of detection of the presence of the carrier to next detection of the presence of the carrier.

Figure 23A:
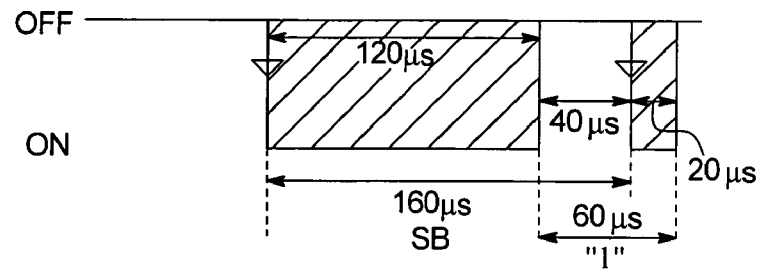
FIGS. 23A to 23C are diagrams for explaining start bits.

In the start bit SB, the carrier is present during a period of 120 μs. Thus, when the immediately succeeding data is logic "1", of a period of 60 μs succeeding the period of 120 μs, the carrier is absent during a period of the first 40 μs, and the carrier is present during a period of the next 20 μs, as shown in FIG. 23A. Thus, in this case, the interval between a falling edge (timing of detection of the presence of the carrier) and a next falling edge is 160 μs (=120 μs+40 μs).

Figure 23B:
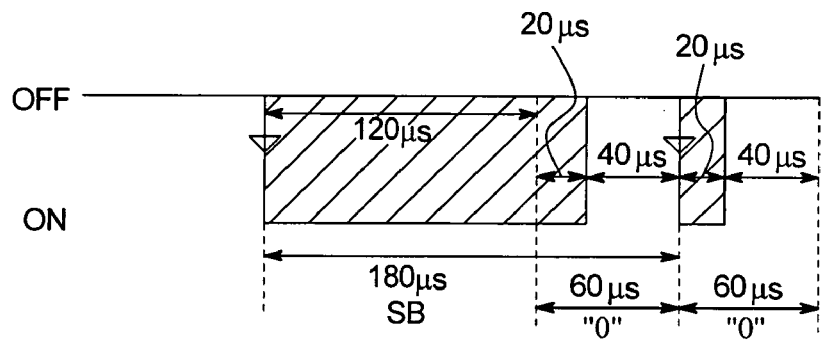
Figure 23C:
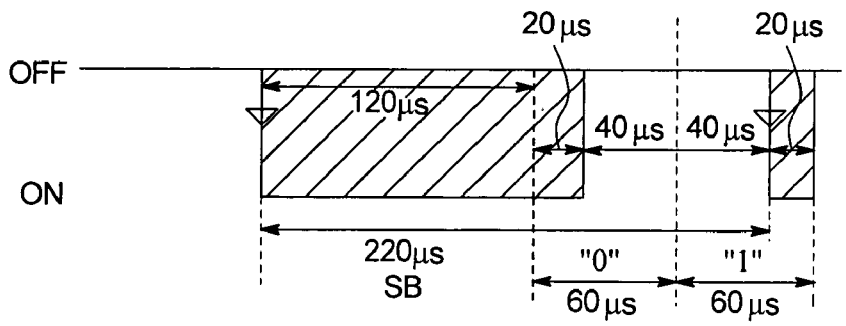

On the other hand, when the data immediately succeeding the start bit SB of 120 μs is logic "0", the carrier is present during a period of the first 20 μs of a unit segment of 60 μs, i.e., during a period of 140 μs in total including the start bit SB, and the carrier is absent during a period of the next 40 μs, as shown in FIGS. 23B and 23C.

When the second data succeeding the first data of logic "0" is logic "0", as shown in FIG. 23B, the carrier is present during a period of the first 20 μs of a unit segment of 60 μs, and the carrier is absent during a period of the next 40 μs. Thus, the interval between the first falling edge of the start bit SB and the next falling edge (the edge of the carrier of the second logic "0") is 180 μs (=120μs+20 μs+40 μs).

On the other hand, when the data immediately succeeding the start bit SB is logic "0" and the succeeding second data is logic "1", as shown in FIG. 23C, the carrier is absent during a period of the first 40 μs of the second unit segment continued from the no-carrier segment of 40 μs of the immediately preceding unit segment, and the carrier is present during a period of the next 20 μs. Thus, the interval between the first falling edge of the start bit SB and the next falling edge (falling edge of the carrier of 20 μs of the second data) is 220 μs (=120 μs+20 μs+40 μs+40 μs).

FIGS. 24A to 24E show binary data in the data segment.

Figure 24A:
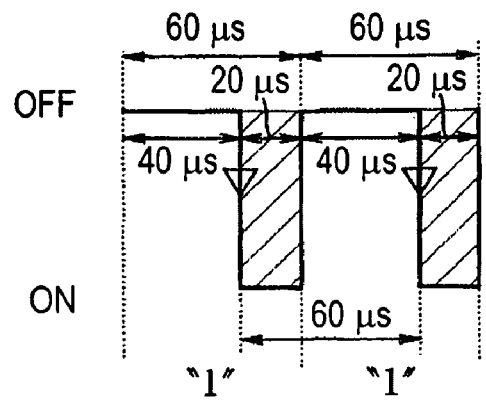
FIGS. 24A to 24E are diagrams for explaining binary data.

When two successive logic values are "11", as shown in FIG. 24A, the interval between the falling edge of the period of 20 μs associated with the end of the previous unit segment and the falling edge at the beginning of the carrier segment of 20 μs associated with the end of the next unit segment is 60 μs (=20 μs+40 μs).

Figure 24B:
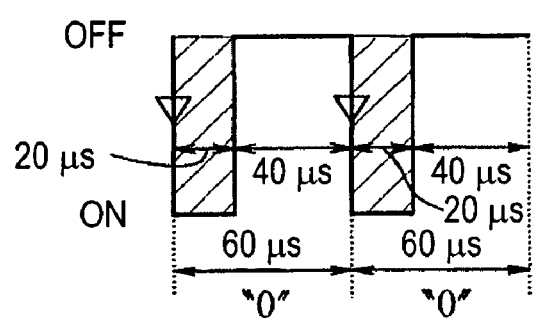

When successive two bits are "00", as shown in FIG. 24B, the interval between the falling edge of the carrier period of the first 20 μs of the previous unit segment and the falling edge of the first 20 μs of the succeeding unit segment is 60 μs (=20 μs+40 μs).

Figure 24C:
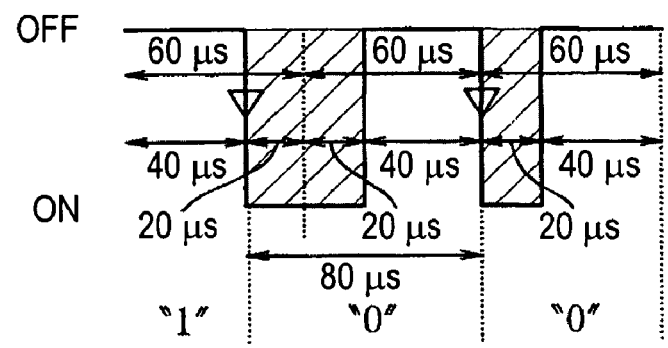

When successive two bits are "10" and the further succeeding bit is "0", as shown in FIG. 24C, the interval between the falling edge of the carrier segment of 20 μs associated with the end of the first unit segment among the three unit segments and the falling edge of the carrier segment of 20 μs of the third unit segment is 80 μs (=20 μs+20 μs+40 μs).

Figure 24D:
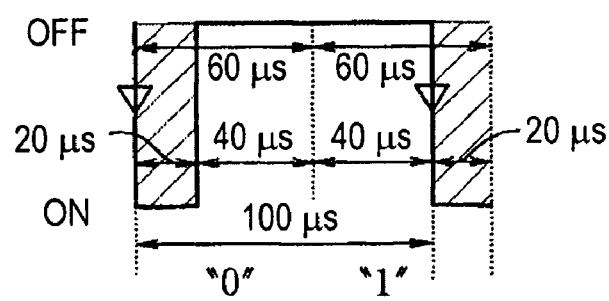
Figure 24E:
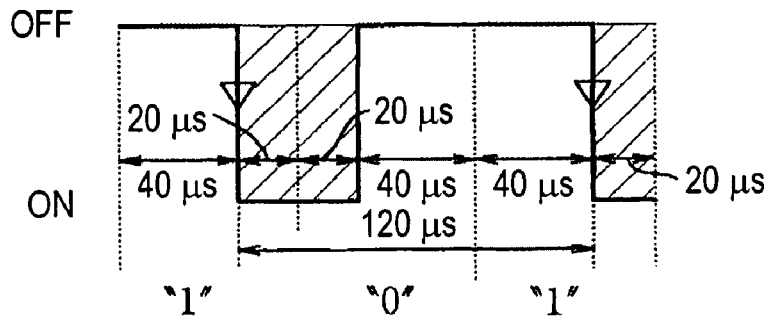

On the other hand, when successive two bits are "10" and the further succeeding bit is "0", as shown in FIG. 24E, the interval between the falling edge of the carrier segment of 20 μs associated with the end of the first unit segment among the three successive unit segments and the falling edge of the carrier segment of 20 μs associated with the end of the third unit segment is 120 μs (=20 μs+60 μs+40 μs).

When successive two bits are "01", as shown in FIG. 24D, the interval between the falling edge of the carrier segment of the first 20 μs of the previous unit segment and the falling edge of the carrier segment of 20 μs associated with the end of the succeeding unit segment is 100 μs (=60 μs+40 μs).

Figure 25A:
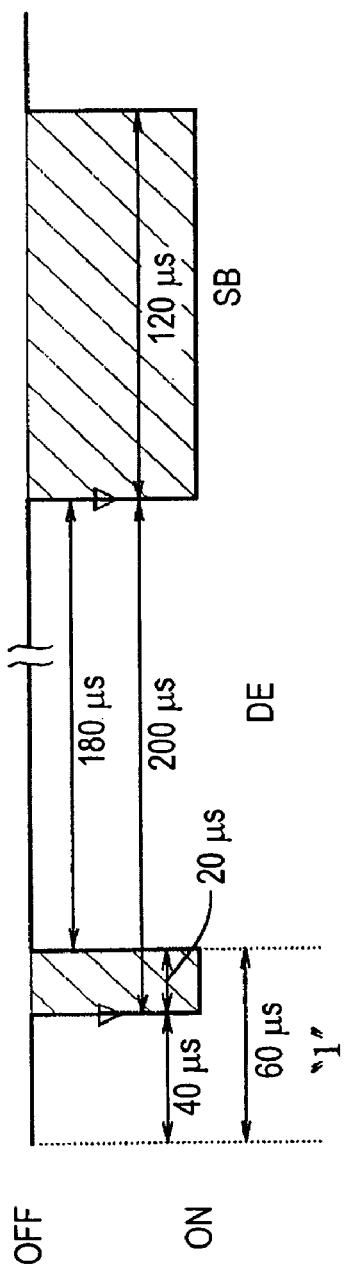
FIGS. 25A to 25C are diagrams for explaining data ends.
Figure 25B:
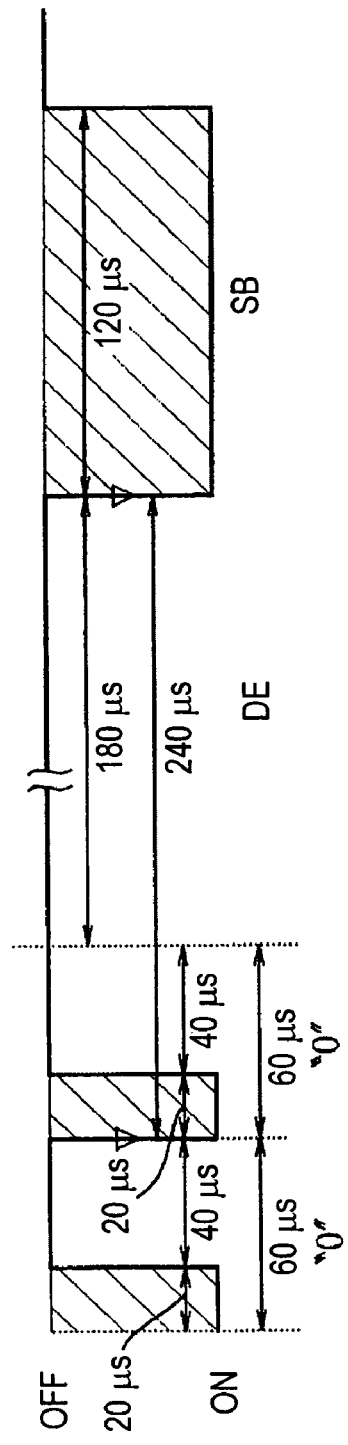
Figure 25C:
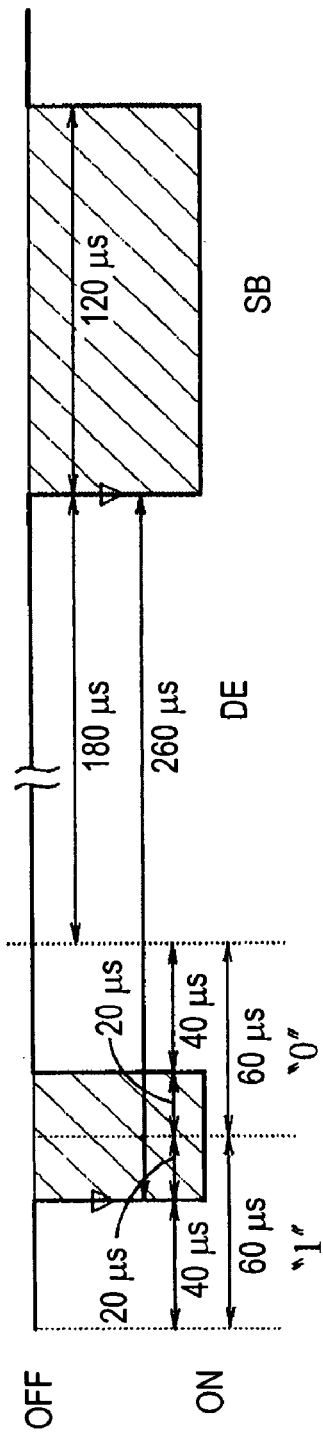

The data end DE is detected as shown in FIGS. 25A to 25C. In the first to fourth packets of the five packets except for the fifth packet, the start bit SB of the next packet is disposed immediately after the data DE. Thus, at the end of a no-carrier segment of 180 μs, a falling edge of the start bit SB of the carrier having a length of 120 μs exists.

When the data immediately preceding the data end DE is logic "1", as shown in FIG. 25A, a falling edge of a carrier segment of 20 μs associated with the unit segment exists. Thus, the interval between the falling edge and the falling edge of the start bit SB immediately succeeding the data end DE is 200 μs (=20 μs+180 μs).

When the data immediately preceding the data end DE is logic "0" and the further preceding data is logic "0", a falling edge of the carrier segment of the first 20 μs of logic "0" immediately preceding the data end DE exists. Thus, the interval between the falling edge and the falling edge of the start bit SB immediately succeeding the data end DE is 240 μs (=60 μs+180 μs).

When the data immediately preceding the data end DE is logic "0" and the further preceding data is logic "1", a falling edge of the carrier segment of the last 20 μs of the unit segment of logic "1" exists. Thus, the interval between the falling edge and the falling edge of the start bit SB is 260 μs (=20 μs+60 μs+180 μs).

As is apparent from the comparison of the falling-edge intervals in FIGS. 23A to 23C, FIGS. 24A to 24E, and FIGS. 25A to 25C, the intervals of 160 μs, 180 μs, and 220 μs of the start bit SB in FIGS. 23A to 23C do not appear as the intervals of the binary data in FIGS. 24A to 24E or the intervals of the data ends DE in FIGS. 25A to 25C. Thus, when an interval is 160 μs, 180 μs, or 220 μs, that alone suffices to determine unambiguously that a start bit SB has been detected. Furthermore, when the interval is 160 μs, it is determined unambiguously that the data following the start bit SB is logic "1". Similarly, when the interval is 180 μs, it is determined unambiguously that the data following the start bit SB is logic "00". When the interval is 220 μs, it is determined unambiguously that the data following the start bit SB is logic "01".

The lengths 60 μs, 80 μs, 100 μs, and 120 μs of the binary data in FIGS. 24A to 24E are not detected as the intervals of the starts bits SB in FIGS. 23A to 23C or the intervals of the data ends DE in FIGS. 25A to 25C. Thus, when an interval of 60 μs, 80 μs, 100 μs, or 120 μs is detected, the logic of binary data can be determined in the following manner.

When an interval of 60 μs is detected, the current data is logic "1" if the immediately preceding data is logic "1", as shown in FIG. 24A, while the current data is logic "0" if the immediately preceding data is logic "0", as shown in FIG. 24B.

When an interval of 80 μs is detected, it is determined that the immediately preceding data is logic "1" and the current data and the immediately succeeding data are logic "0", as shown in FIG. 24C.

When an interval of 100 μs is detected, it is determined unambiguously that the current data is logic "1" and the immediately preceding data is logic "0", as shown in FIG. 24D.

When an interval of 120 μs is detected, it is determined unambiguously that the current data is logic "1", the immediately preceding data is logic "0", and the further preceding data is logic "1", as shown in FIG. 24E.

When an interval of 200 μs, 240 μs, or 260 μs is detected, since these intervals are not detected in the binary data in FIGS. 24A to 24E or the start bits SB in FIGS. 23A to 23C, it is determined unambiguously that a data end DE has been detected. When the interval detected is 200 μs, the data immediately preceding the data end DE is logic "1", as already detected from the pattern shown in FIG. 24A or FIG. 24D.

It has already been detected from the pattern shown in FIG. 24B that the immediately preceding data is logic "00" when the data end DE is 240 μs.

When the interval detected is 260 μs, it is also determined unambiguously that the binary data immediately preceding the data end DE is logic "0". It has already been detected from the pattern shown in FIG. 24A or FIG. 24D that the further preceding binary data is logic "1".

Figure 26:
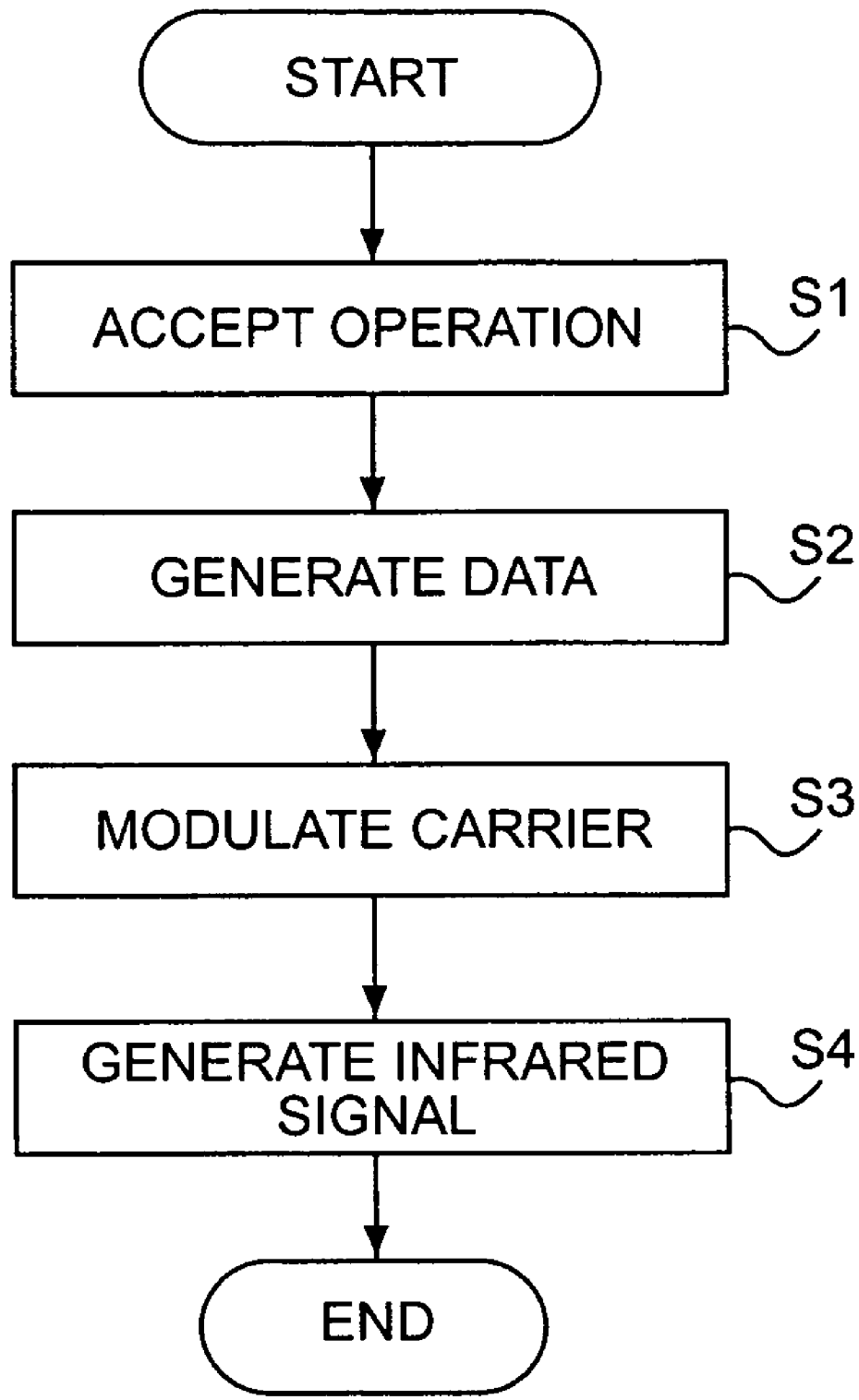
FIG. 26 is a flowchart of a transmission process.

Next, a process of transmitting an infrared signal by the remote controller 11 will be described with reference to a flowchart shown in FIG. 26.

First, in step S1, the operating unit 41 accepts an operation by the user. That is, the user operates a certain key of the remote controller 11 to instruct, for example, a movement of a cursor displayed on the plasma display 13. The operating unit 41 outputs a signal corresponding the key operated by the user to the data generator 42.

In step S2, the data generator 42 generates data corresponding to the signal fed from the operating unit 41. More specifically, for example, the data generator 42 generates data indicating that a right arrow key has been operated when the right arrow key has been operated by the user. The data generated is fed to the carrier modulator 43.

In step S3, the carrier modulator 43 modulates a carrier based on the data input from the data generator 42.

As described earlier, the data generator 42 generates five packets including a start bit SB, 24-bit binary data following the start bit SB, and a data end DE following the binary data.

The carrier modulator 43 generates a carrier having a frequency of 455 kHz during periods in which the level of the signal fed from the data generator 42 is a first level, which is lower, while refraining the generation of the carrier during periods in which the level is a second level, which is higher.

In step S4, the light emitter 44 generates an infrared signal. More specifically, the light-emitting element 45 in the light emitter 44 is driven based on the signal fed from the carrier modulator 43 to generate an infrared signal as a remote control signal.

The infrared signal generated in the manner described above is cast on the receiver 12A of the television tuner 12. Of the incident infrared signal, the optical bandpass filter 81 extracts only components of wavelengths in a range shown in FIG. 10 and supplies the components to the photoreceptor element 82. The photoreceptor element 82 converts the incident infrared signal into an electric signal, and outputs the electric signal to the carrier filter 83. Of the incident signal, the carrier filter 83 transmits only signal components having frequencies in a range shown in FIG. 15. Thus, as shown in FIG. 16, a carrier component having a frequency of 455 kHz is extracted while parasitic emission components generated by the plasma display 13 shown in FIG. 17 are suppressed. Accordingly, interference on the remote control signal by the parasitic emission components generated by the plasma display 13 is suppressed.

The reception amp 84 amplifies the input signal, and outputs the amplified signal to the command filter 85. The command filter 85 determines the type of the input signal, and outputs the result to the command decoder 86. The command decoder 8 decodes the command based on the type of the input signal, and outputs the resulting remote control code to the controller 61.

The controller 61 executes processing corresponding to the remote control code fed from the command decoder 86. In this example, the controller 61 generates data for moving the cursor to a position corresponding to the operation performed by the user, and outputs the data to the combiner 63. The combiner 63 combines the data for displaying the cursor, fed from the controller 61, with the image data fed from the tuner 62, and outputs the resulting data to the plasma display 13 so that a corresponding image is displayed.

In this manner, the cursor is moved to the position corresponding to the operation performed by the user.

Next, the configuration and operation of the command filter 85 will be described in more detail.

Figure 27:
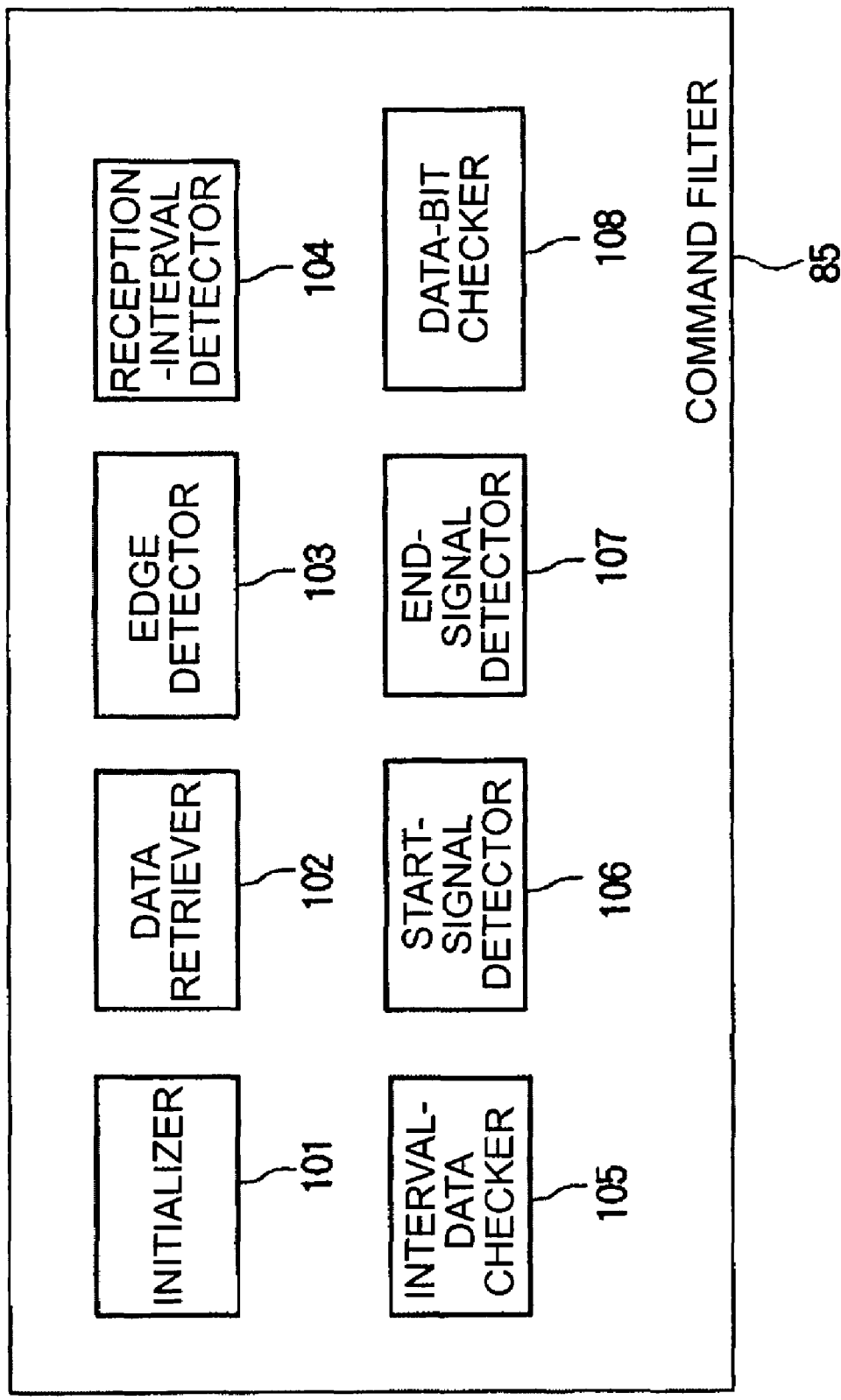
FIG. 27 is a block diagram showing an example functional configuration of a command filter shown in FIG. 8.
Figure 28:
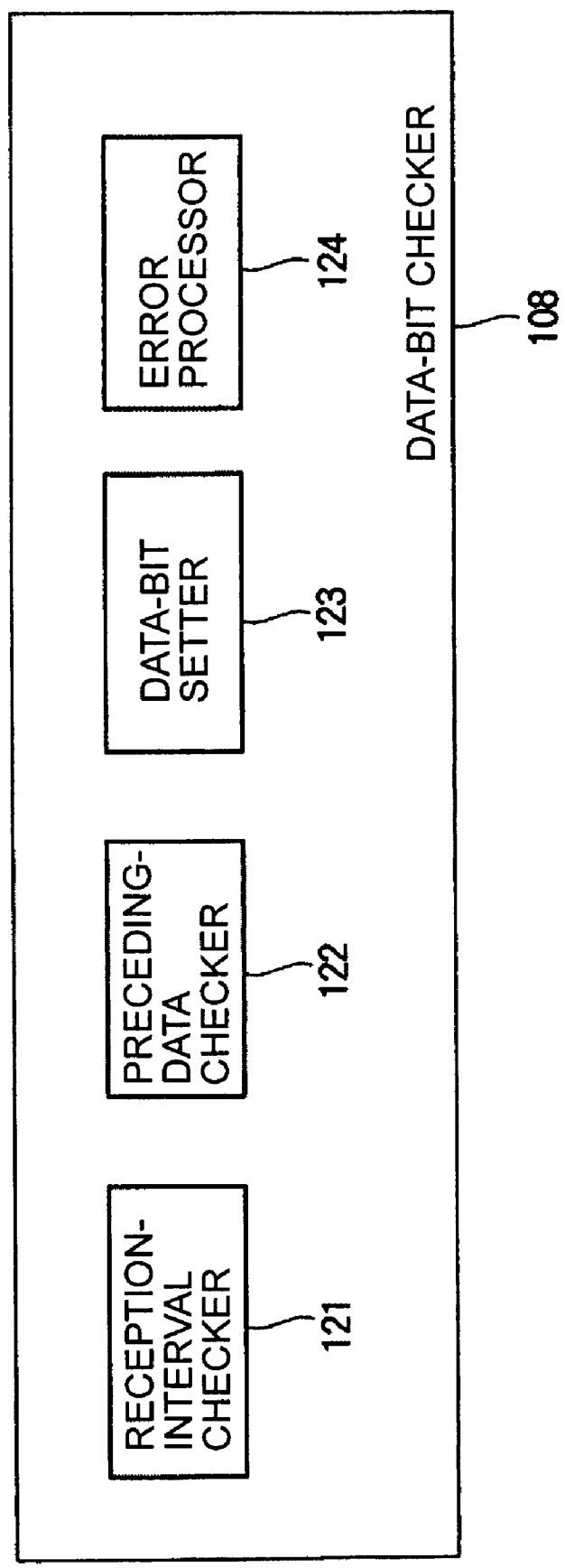
FIG. 28 is a block diagram showing an example functional configuration of a data-bit checker shown in FIG. 27.

As shown in FIG. 27, the command filter 85 includes an initializer 101, a data retriever 102, an edge detector 103, a reception-interval detector 104, an interval-data checker 105, a start-signal detector 106, an end-signal detector 107, and a data-bit checker 108. Furthermore, as shown in FIG. 28, the data-bit checker 108 includes a reception-interval checker 121, a preceding-data checker 122, a data-bit setter 123, and an error processor 124.

The initializer 101 performs initialization. The data retriever 102 retrieves data to be processed based on the infrared signal. The edge detector 103 detects rising edges or falling edges, falling edges in this embodiment, of the signal retrieved by the data retriever 102. The reception-interval detector 104 detects the interval of the falling edges detected by the edge detector 103. The interval-data checker 105 checks the presence or absence of reception-interval data. The start-signal detector 106 detects a start signal based on the reception interval detected by the reception-interval detector 104. The end-signal detector 107 detects a data end DE based on the reception interval detected by the reception-interval detector 104. The data-bit checker 108 determines the logic of binary data.

More specifically, the reception-interval checker 121 of the data-bit checker 108 determines whether the reception-interval data is 60 μs, 80 μs, 100 μs, or 120 μs. The preceding-data checker 122 determines whether the immediately preceding data is logic "0" or logic "1". The data-bit setter 123 sets logic "1" or logic "0" to a data bit currently being processed. The error processor 124 executes error processing, for example, when a correct interval is not obtained.

Next, a command outputting process executed by the command filter 85 and the command decoder 86 will be described in detail with reference to a flowchart shown in FIG. 29.

In step S11, the initializer 101 performs initialization. Then, in step S12, the data retriever 102 retrieves data that is to be processed. More specifically, the data retriever 102 retrieves data based on the infrared signal fed from the reception amp 84. In step S13, the edge detector 103 detects edges of the signal retrieved by the data retriever 102. In this example, of rising edges and falling edges, the edge detector 103 detects only falling edges. By detecting only one type of edges, compared with a case where both types of edges are detected, the processing interval becomes longer so that detection is facilitated.

In step S14, the reception-interval detector 104 accepts the edges detected by the edge detector 103 as reception-interval data. Then, the reception-interval detector 104 detects the interval of the falling edges received, for example, by counting the number of cycles based on a reference clock.

In step S15, the interval-data checker 105 determines whether the reception interval (edge interval) has been measured. When the reception interval has not been measured, the process returns to step S12, and subsequent steps are repeated.

When it is determined in step S15 that the reception-interval has been measured, in step S16, the start-signal detector 106 determines whether the reception interval is the interval of a start signal. As described earlier with reference to FIGS. 23A to 23C, when the data is a start signal (start bit SB), the length of the reception interval is 160 μs, 180 μs, or 220 μs.

When the reception interval measured in step S14 is one of these three intervals, in step S17, the start-signal detector 106 detects the start signal and an immediately succeeding bit. More specifically, when the reception interval is 160 is, the start bit SB is detected, and it is also detected that the immediately succeeding binary data is logic "1", as shown in FIG. 23A. When the reception interval is 180 μs, the start bit SB is detected, and it is also detected that the immediately succeeding binary data is logic "00", as shown in FIG. 23B. When the reception interval is 220 μs, the start bit SB is detected, and it is also detected that the immediately succeeding binary data is logic "01", as shown in FIG. 23C. Then, the process returns to step S12, and subsequent steps are repeated.

Since the length of the reception interval is represented on the basis of the number of clock cycles, the length is determined on the basis of the number of clock cycles.

Figure 30:
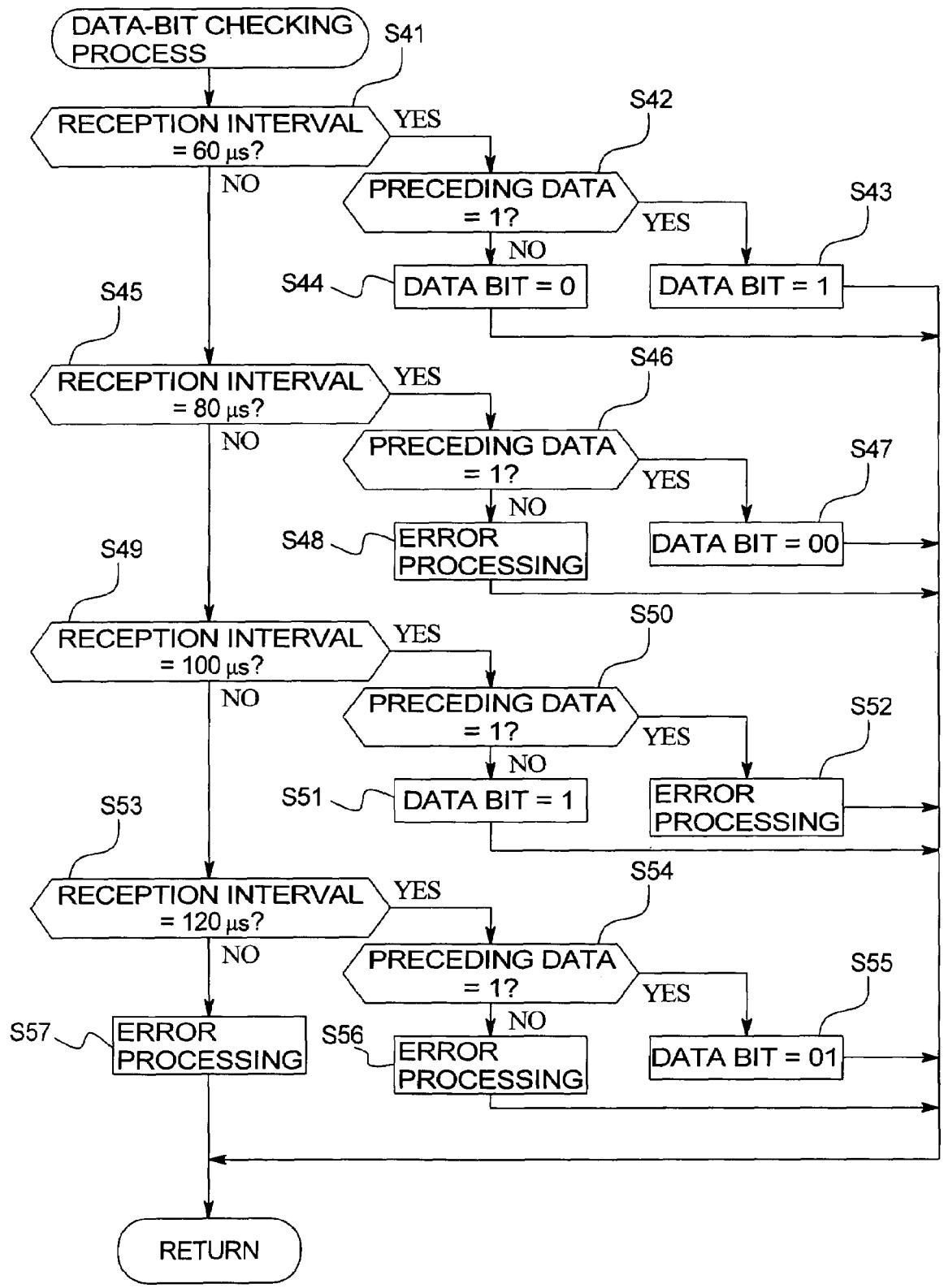
FIG. 30 is a flowchart of a data-bit checking process in step S19 shown in FIG. 29.

When it is determined in step S16 that the reception interval is not the interval of a start signal, in step S18, the end-signal detector 107 determines whether the reception interval is the interval of a data end DE. As described earlier with reference to FIGS. 25A to 25C, when a data end DE is present, the reception interval is 200 μs, 240 μs, or 260 μs. When the reception interval is none of these intervals, in step S19, a data-bit checking process is executed. The data-bit checking process will be described with reference to a flowchart shown in FIG. 30.

In step S41, the reception-interval checker 121 determines whether the reception interval measured in step S14 is 60 μs.

When the reception interval is 60 μs, in step S42, the preceding-data checker 122 determines whether the immediately preceding data is logic "1". When the reception interval is 60 μs and the immediately preceding data is "1", in step S43, the data-bit setter 123 sets logic "1" to the current data bit, as shown in FIG. 24A.

On the other hand, when it is determined in step S42 that the immediately preceding data is not logic "1" (i.e., when it is determined as logic "0"), in step S44, the data-bit setter 123 sets logic "0" to the current data bit, as shown in FIG. 24B.

When it is determined in step S41 that the reception interval is not 60 μs, in step S45, the reception-interval checker 121 determines whether the interval is 80 μs. When the reception interval is 80 μs, in step S46, the preceding-data checker 122 determines whether the immediately preceding data is logic "1". When it is determined that the immediately preceding data is logic "1", in step S47, the data-bit setter 123 sets logic "00" to the current data bit and the immediately preceding data bit, as shown in FIG. 24C.

On the other hand, when it is determined in step S46 that the immediately preceding data is not logic "1" (i.e., it is logic "0"), in step S48, the error processor 124 executes error processing. That is, as shown in FIG. 24C, the reception interval of 80 μs only occurs in the case of the combination of binary data of logic "10". Thus, when the immediately preceding data is logic "0" even though the reception interval is 80 μs, incorrect detection could have occurred due to noise. Thus, the error processor 124 executes error processing.

By checking logic of data bits based on the reception interval as described above, error caused by noise or the like can be detected. Thus, in this embodiment, parity codes or the like for error detection are not needed.

When it is determined in step S45 that the reception interval is not 80 μs, in step S49, the reception-interval checker 121 determines whether the reception interval is 100 μs. When the reception interval is 100 μs, in step S50, the preceding-data checker 122 determines whether the immediately preceding data is logic "1". When the immediately preceding data is not logic "1" (i.e., it is logic "0"), in step S51, the data-bit setter 123 sets logic "1" to the current data bit, as shown in FIG. 24D.

When it is determined in step S50 that the immediately preceding data is logic "1", in step S52, the error processor 124 executes error processing. That is, since a reception interval of 100 μs occurs only in the case of a binary code of logic "01", an error caused by noise or the like is assumed when the immediately preceding data is logic "1".

When it is determined in step S49 that the reception interval is not 100 μs, in step S53, the reception-interval checker 121 determines whether the reception interval is 120 μs. When the reception interval is 120 μs, in step S54, the preceding-data checker 122 determines whether the immediately preceding data is logic "1". When the immediately preceding data is logic "1", in step S55, the data-bit setter 123 sets logic "01" to the current data bit and the immediately preceding data bit, as shown in FIG. 24E.

When it is determined in step S54 that the immediately preceding data is not logic "1" (i.e., it is logic "0"), in step S56, the error processor 124 executes error processing. That is, as shown in FIG. 24E, since a reception interval of 120 μs occurs only when a binary code is logic "01", an error caused by noise or the like is assumed when the immediately preceding data is not logic "1".

When it is determined in step S53 that the reception interval is not 120 μs, i.e., when it is determined that the reception interval is none of 60 μs, 80 μs, 100 μs, or 120 μs (it has already been determined that the reception interval is not the interval of a start signal or the interval of a data end DE), in step S57, the error processor 124 executes error processing.

Figure 29:
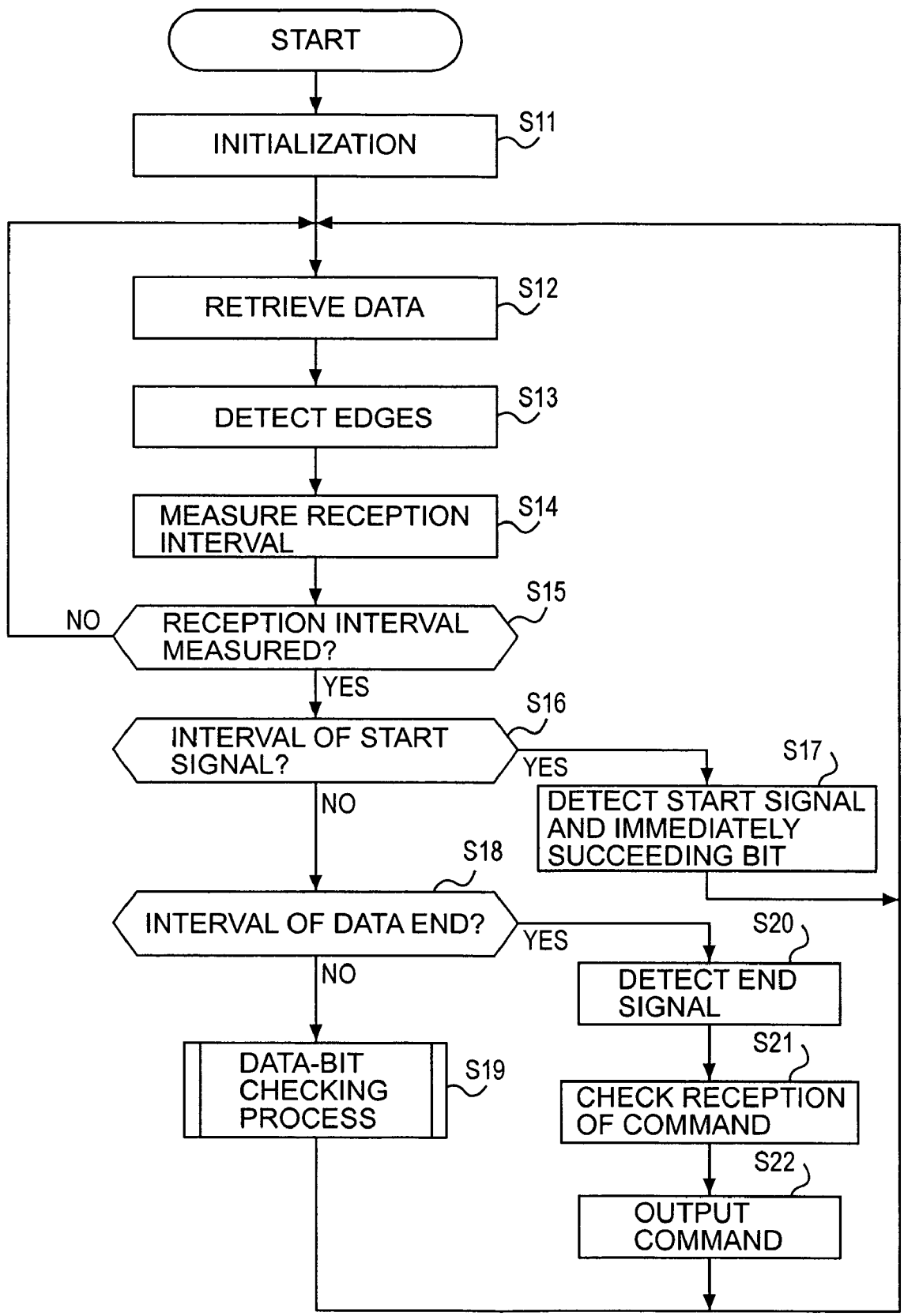
FIG. 29 is a flowchart of a command outputting process.

After steps S43, S44, S47, S48, S51, S52, S55, S56, and S57, the process returns to step S19 shown in FIG. 29.

When it is determined in step S18 shown in FIG. 29 that the reception interval is the interval of a data end DE, i.e., when it is determined as 200 μs, 240 μs, or 260 μs, the process proceeds to step S20. As for the last packet of the five packets, a start bit SB does not exist immediately after the data end DE of 180 μs. Thus, it is determined that a data end DE has been detected also when it is determined that the reception interval is longer than 220 μs as shown in FIG. 23C (i.e., a maximum interval of signals other then the data end DE) (also when a timeout has been detected).

In step S20, the end-signal detector 107 detects an end signal. More specifically, when the reception interval is 200 μs, the presence of a data end DE is detected, as shown in FIG. 25A. Similarly, when the reception interval is 240 μs, a data end DE is detected, as shown in FIG. 25B. On the other hand, when the reception interval is 260 μs, as shown in FIG. 25C, a data end DE is detected, and it is also detected that the immediately preceding binary code is logic "0".

The result indicating the data type determined by the command filter 85 is fed to the command decoder 86. In step S21, the command decoder 86 determined whether a command has been received. When it is determined that a command has been received, in step S22, the command decoder 86 output a command represented by the binary data fed from the command filter 85.

Figure 31:
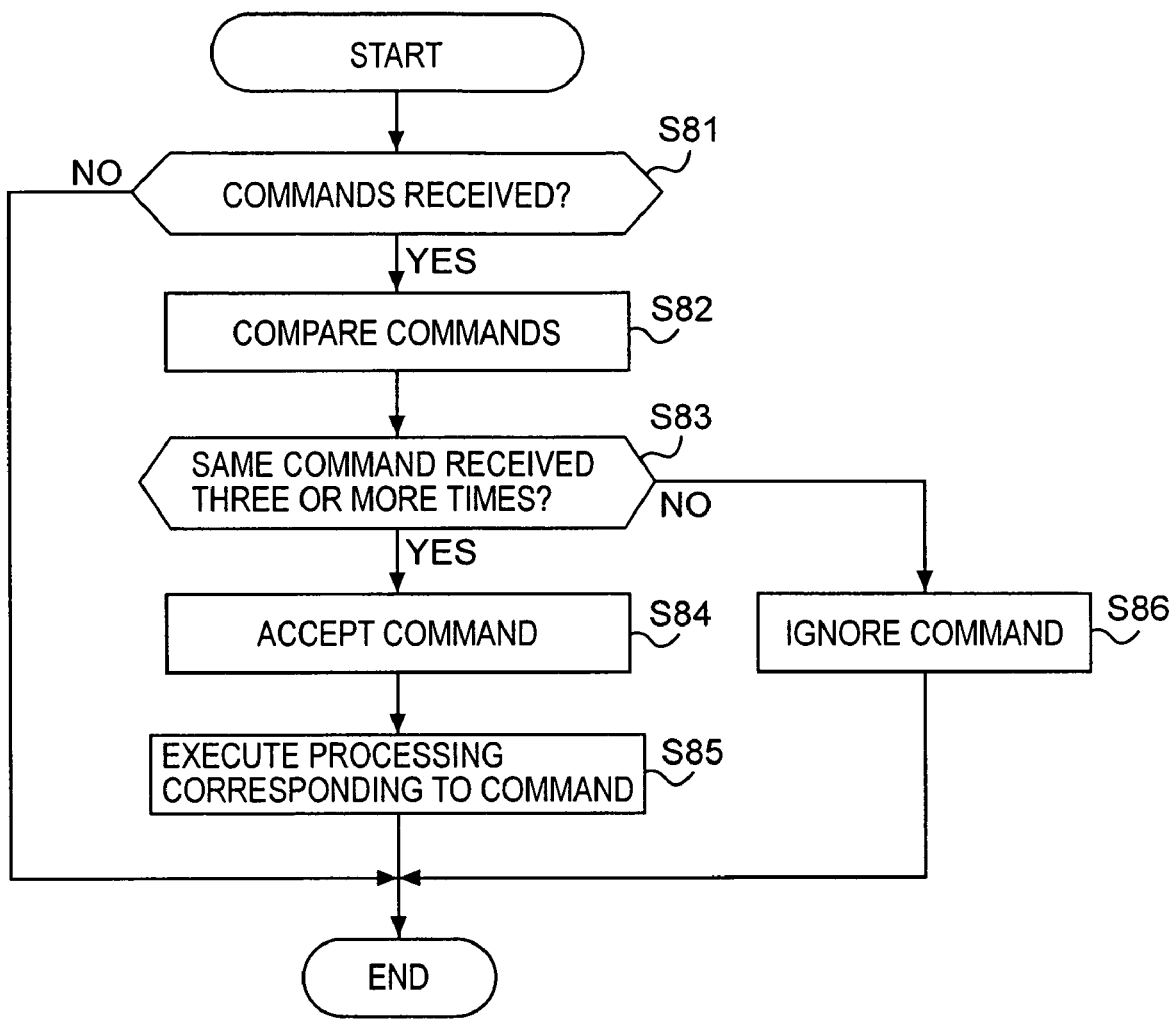
FIG. 31 is a flowchart of a command checking process.

In the manner described above, the controller 61 executes the command checking process according to the flowchart shown in FIG. 31 upon receiving a remote control signal from the command decoder 86.

More specifically, in step S81, the controller 61 determines whether a command has been received. When it is determined that a command has been received, in step S82, the controller 61 compares the command. That is, since a command is transmitted in five packets as described earlier, the controller 61 compares the command in each of the packets. More specifically, the controller 61 determines whether three or more packets out of the five packets in the same command interval represent the same command. When three or more packets represent the same command, in step S84, the controller 61 accepts the command received. Then, in step S85, the controller 61 executes processing corresponding to the command accepted in step S84. For example, the controller 61 generate image data representing movement of the cursor, and outputs the data to the combiner 63, so that the image data is combined with a broadcasting image fed from the tuner 62. Thus, the position of the cursor on the plasma display 13 is changed.

When it is determined in step S83 that the same command has not been received three or more times, i.e., when it is determined that the same command has been received only two or less times in step S86, the controller 61 ignores the command.

When it is determined in step S81 that a command has not been received, or after step S85 or step S86, the process is exited.

In the example described above, logic "0" is represented by a signal having an edge that changes from the first level to the second level at a position that is one third from the beginning of a unit segment of 60 μs, and logic "1" is represented by a signal having an edge that changes from the second level to the first level at a position that is two thirds from the beginning of a unit segment. Alternatively, it is theoretically possible that the positions of the edges of transition in unit segments are located at one half from the beginning of the unit segments (i.e., a duty ratio of 1 to 1). In this case, however, as shown in FIGS. 32A to 32E, the types of combination of falling-edge intervals is reduced compared with cases where the position of transition is one third or two thirds from the beginning of a unit segment (i.e., a duty ratio of 1/3 or 2/3) as shown in FIGS. 24A to 24E. That is, when successive bits are logic "11" or logic "00" as shown in FIGS. 32A to 32E, the interval between adjacent falling edges is 60 μs, similarly to the case shown in FIGS. 24A and 24B.

Figure 32A:
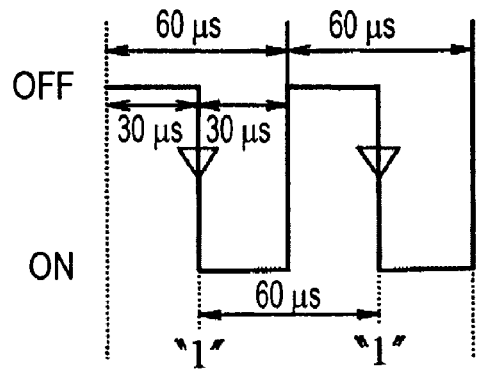
FIGS. 32A to 32E are diagrams for explaining edge intervals with a duty ratio of 1 to 1.
Figure 32B:
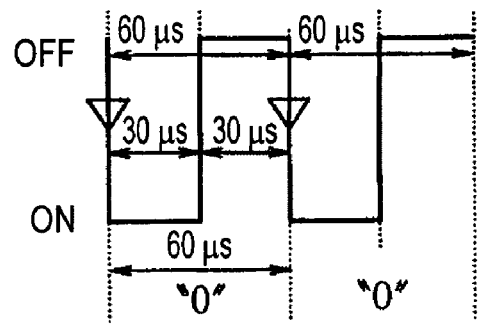
Figure 32C:
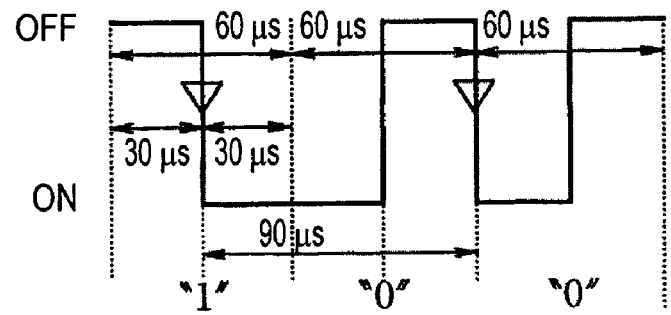
Figure 32D:
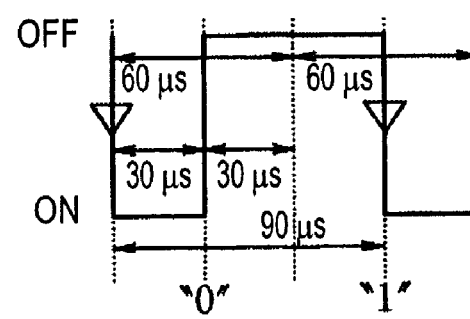
Figure 32E:
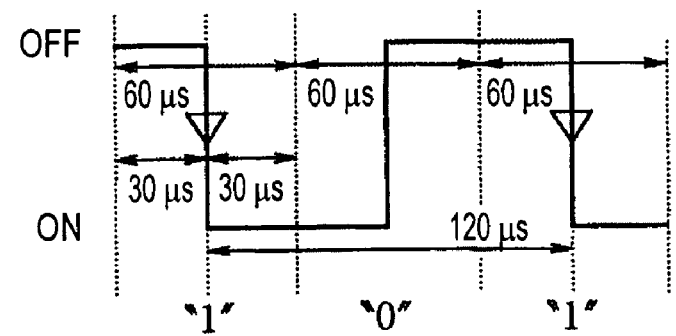

When successive data of binary data are logic "101" as shown in FIG. 32E, the interval between adjacent falling edges is 120 μs, similarly to the case shown in FIG. 24E.

An interval of 90 μs between adjacent falling edges occurs both when a binary code is "100" and "01", as shown in FIGS. 32C and 32D. This differs from the cases shown in FIGS. 24C and 24D, in which the interval is 80 μs and 100 μs, respectively. That is, when the position of transition (duty ratio) is one half, the patterns of edge interval is reduced. This indicates that it becomes more difficult to determine a binary code unambiguously from an edge interval. That is, insusceptibility to noise is reduced. Thus, preferably, an edge transition is located at a position that is one third or two thirds of a unit segment.

The position of transition may be 1/n (n=3, 4, 5, . . . ) or (n−1)/n instead of one third or two thirds from the beginning of a unit segment.

Figure 33:
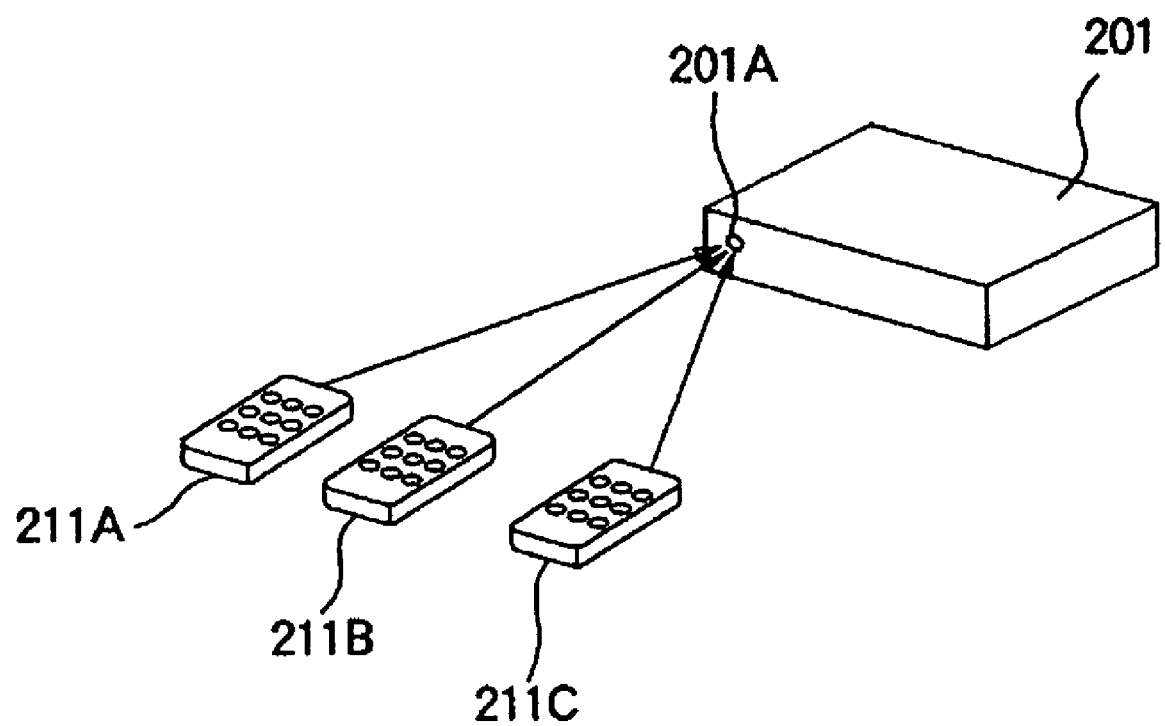
FIG. 33 is a diagram showing an example configuration for controlling an apparatus by a plurality of remote controllers.

In the example described above, a single apparatus is controlled by a single remote controller. However, it is possible to control an apparatus by a plurality of remote controllers. FIG. 33 shows an example configuration of this case. In this example, an apparatus 201 is remote-controlled by remote controllers 211A to 211C. The apparatus 201 includes a receiver 201A that receives infrared signals from the remote controllers 211A to 211C.

Figure 34:
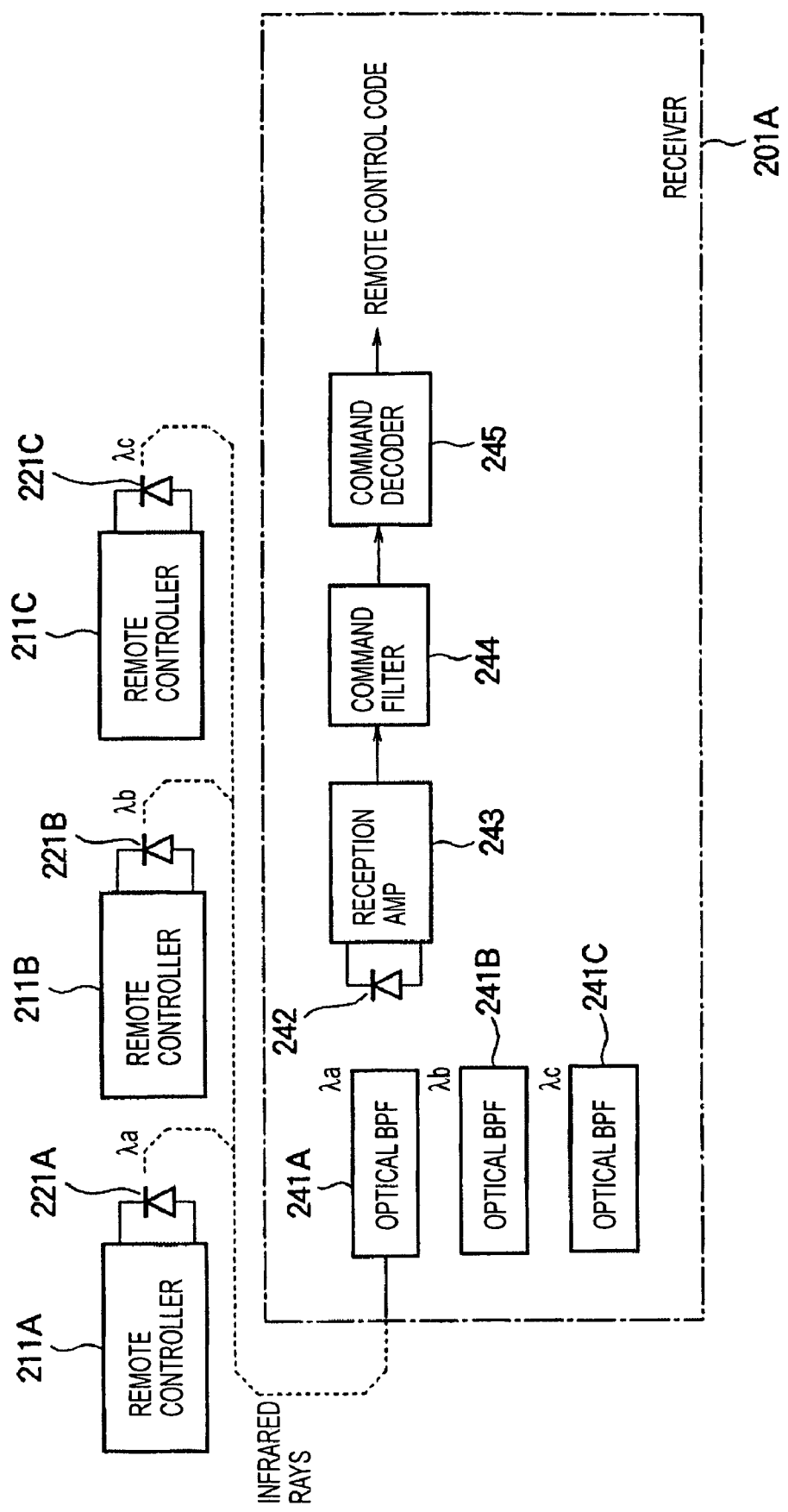
FIG. 34 is a block diagram showing an example functional configuration of a receiver shown in FIG. 33.

That is, as shown in FIG. 34, in this embodiment, the remote controllers 211A to 211C output infrared signals having different wavelengths by light-emitting elements 221A to 221C. The light-emitting element 221A outputs an infrared signal having a wavelength λa, the light-emitting element 221B outputs an infrared signal having a wavelength λb, and the light-emitting element 221C outputs an infrared signal having a wavelength λc.

The receiver 201A of the controlled apparatus 201 includes optical bandpass filters 241A to 241C. The optical bandpass filter 241A extracts a wavelength band centered at the wavelength λa, output from the remote controller 211A. The optical bandpass filter 241B extracts a wavelength band centered at the wavelength λb, output from the remote controller 211B. The optical bandpass filter 241C extracts a wavelength band centered at the wavelength λc, output from the remote controller 211C.

The optical bandpass filters 241A to 241C are switched as desired by the user so that one of them is used. When the optical bandpass filter 241A is being used, the infrared signal generated by the remote controller 211A is extracted and cast on a photoreceptor element 242. When the optical bandpass filter 241B is selected by switching, the infrared signal generated by the remote controller 211B is extracted and cast on the photoreceptor element 242. When the optical bandpass filter 241C is selected by switching, the infrared signal generated by the remote controller 211C is extracted and cast on the photoreceptor element 242. The optical bandpass filter 241A does not transmit the infrared signals output from the remote controllers 211B and 211C. Similarly, the optical bandpass filter 241B does not transmit the infrared signals output from the remote controllers 211A and 211C. Similarly, the optical bandpass filter 241C does not transmit the infrared signals output from the remote controllers 211A and 211B. Thus, an infrared signal from only one remote controller is cast on the photoreceptor element 242.

The photoreceptor 242, a reception amp 243, a command filter 244, and a command decoder 245 operate in the same manner as the photoreceptor 82, the reception amp 84, the command filter 85, and the command decoder 86 shown in FIG. 8, respectively, so that descriptions thereof will be omitted.

In this embodiment, by switching among a plurality of optical bandpass filters as desired, it is possible to allow only the user of a specific remote controller among the remote controllers to control an apparatus that is to be controlled.

Figure 35:
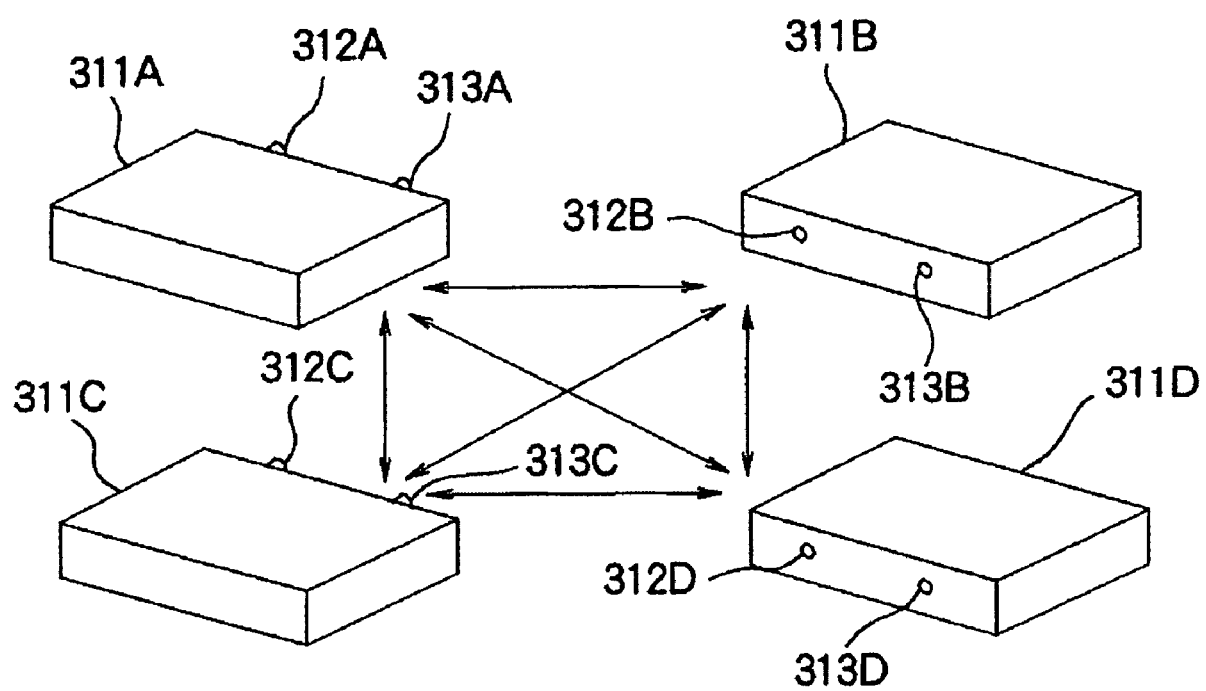
FIG. 35 is a diagram showing an example configuration of communication apparatuses according to an embodiment of the present invention.

This embodiment can be applied to communication between apparatuses as well as remote control of an apparatus. FIG. 35 shows an example configuration of this case. In the example, communication apparatuses 311A to 311D (hereinafter simply referred to as communication apparatuses 311 when these individual apparatuses need not be particularly distinguished from each other) include photoreceptors 312A to 312D (hereinafter simply referred to as photoreceptors 312 when these individual photoreceptors need not be particularly distinguished from each other), and light emitters 313A to 313D (hereinafter simply referred to as light emitters 313 when these individual light emitters need not be particularly distinguished from each other). Thus, each communication apparatus 311 is capable of transmitting/receiving infrared signals by outputting infrared signals from the light emitter 313 thereof to the photoreceptor 312 of another communication apparatus 311.

Figure 36:
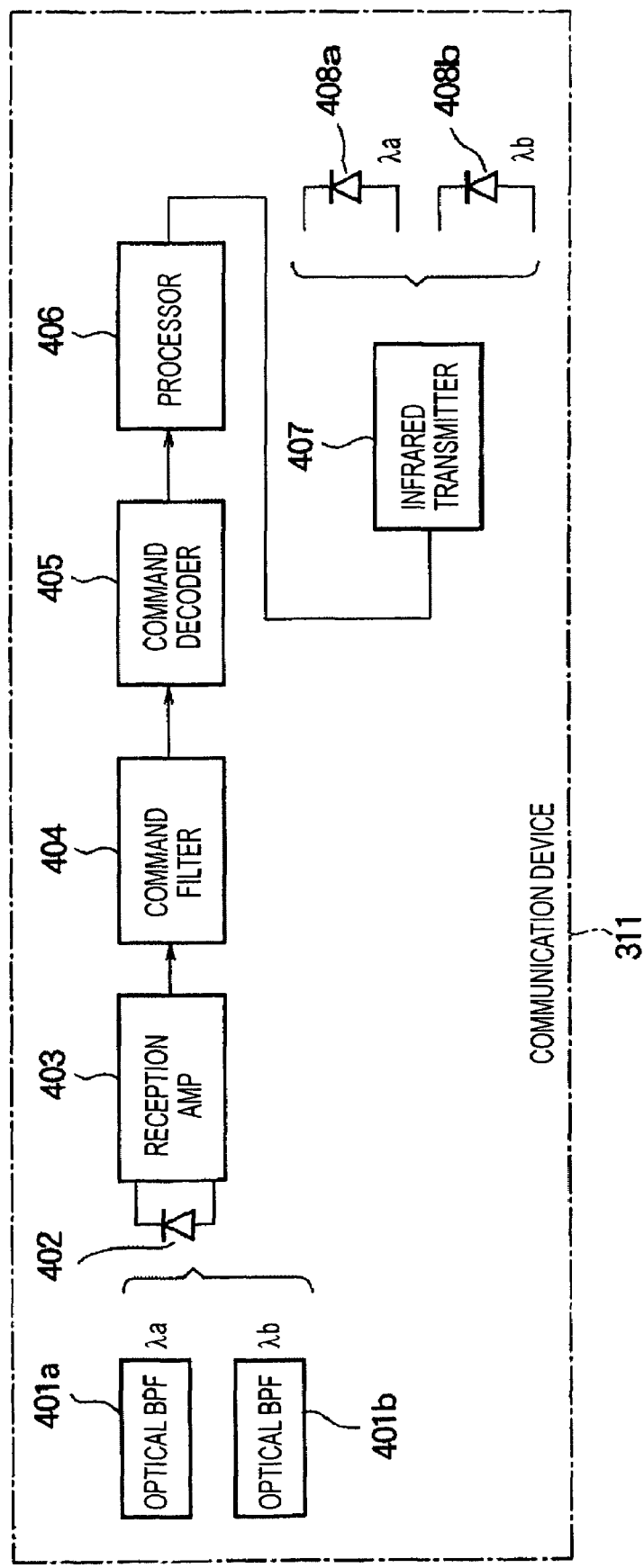
FIG. 36 is a block diagram showing an example functional configuration of a communication apparatus shown in FIG. 35.

FIG. 36 shows an example internal configuration of the communication apparatus 311. An optical bandpass filter 401A extracts light having a wavelength λa, and outputs the light to a photoreceptor element 402. An optical bandpass filter 401B extracts light having a wavelength λb, and outputs the light to the photoreceptor element 402. The photoreceptor element 402, a reception amp 403, a command filter 404, and a command decoder 405 have the same functions as the photoreceptor element 82, the reception amp 84, the command filter 85, and the command decoder 86 shown in FIG. 8. A processor 406 executes processing corresponding to a remote control code input from the command decoder 405.

When outputting a command to another communication apparatus, the processor 406 outputs the command to a light-emitting element 408a or 408b via an infrared transmitter 407. The light-emitting element 408a emits an infrared signal having a wavelength λa, and the light-emitting element 408b outputs an infrared signal having a wavelength λb. The processor 406 switches between the light-emitting elements 408a and 408b as desired to output an infrared signal having the wavelength λa or λb to another apparatus.

That is, in this embodiment, communication paths of two channels with the wavelengths λa and λb are provided by the for communication apparatuses 311A to 311D. Each of the communication apparatuses selects one of the channels as desired. Thus, in this embodiment, two pairs of communication apparatuses are allowed to simultaneously transmit/receive commands independently.

The series of processes described above may be executed either by hardware or by software. When the series of processes is executed by software, programs constituting the software are installed via a network or a recording medium on a computer embedded in special hardware or on a general-purpose personal computer or the like that is capable of executing various types of functions with various types of programs installed thereon.

As shown in FIG. 8, the recording medium is, for example, the removable medium 64 that is distributed for providing programs to a user separately from a computer, such as a magnetic disk (e.g., a floppy disk), an optical disk (e.g., a compact disk-read only memory (CD-ROM) or a digital versatile disk (DVD)), a magneto-optical disk (e.g., a mini-disk (MD)), or a semiconductor memory. Alternatively, the recording medium may be a ROM or a hard disk having the programs recorded thereon, provided to the user as included in a main unit of an apparatus.

Steps of the programs recorded on the recording medium need not necessarily be executed in the orders described in this specification, and may be executed in parallel or individually.

In this specification, a system refers to the entirety of a plurality of apparatuses.

The embodiment of the present invention can be applied, for example, to television receivers.

According to this embodiment, a signal transmitting/receiving system can be implemented. Particularly, according to this embodiment, it is possible to transmit/receive signals without being affected by parasitic emissions generated by another electronic apparatus, such as a plasma display.

Furthermore, according to this embodiment, it is possible to transmit signals in such a manner that the signals are unsusceptible to effects caused by another electronic apparatus, such as a plasma display. Accordingly, it is possible to remote-control another apparatus accurately and reliably based on the signals at an arbitrary position.

Furthermore, according to this embodiment, it is possible to receive a signal and determine the type of the signal. Particularly, it is possible to accurately and simply determine the type of the signal without being affected by parasitic emissions generated by another electronic apparatus, such as a plasma display. This does not require a complex arrangement.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A signal transmitting/receiving system comprising:
a transmitter configured to transmit signals; and
a receiver configured to receive the signals transmitted from the transmitter;
wherein the transmitter transmits signals using;
   (a) first signal having an edge at a position that is 1/n from the beginning of a unit segment; and
   (b) second signal having an edge at a position of (n−1)/n from the beginning of the unit segment, wherein;
      (i) n is an integer greater than or equal to three; and
      (ii) one of the first signal and the second signal representing logic "0" and the other representing logic "1"; and
wherein the receiver;
   (a) detects a reception interval based on:
      (i) said edge at the position that is 1/n from the beginning of the unit segment; and
      (ii) said edge at the position of (n−1)/n from the beginning of the unit segment;
   (b) determines whether the reception interval is a start signal interval by determining whether the reception interval includes any of a first set of a first plurality of lengths;
   (c) determines whether the reception interval is a data end interval by determining whether the reception interval includes any of a second set of a second plurality of lengths, wherein each of said lengths of the second set are different from each of the lengths of the first set;
   (d) sets a first logic by determining whether the reception interval includes a third length, wherein said third length is different from;
      (i) each of the lengths of the first set; and
      (ii) each of the lengths of the second set; and
   (e) sets a second different logic by determining whether the reception interval includes a fourth length, wherein said fourth length is different from;
      (i) each of the lengths of the first set;
      (ii) each of the lengths of the second set; and
      (iii) said third length.

2. The signal transmitting/receiving system according to claim 1,
wherein the receiver determines a signal type based on a length of an edge interval of rising edges of the signals received.

3. The signal transmitting/receiving system according to claim 1,
wherein the receiver determines a signal type based on a length of an edge interval of falling edges of the signals received.

4. A signal transmitting/receiving method for a signal transmitting/receiving system including a transmitter configured to transmit signals and a receiver configured to receive the signals transmitted from the transmitter, the signal transmitting/receiving method comprising:
transmitting signals by the transmitter using;
   (a) a first signal having an edge at a position that is 1/n from the beginning of a unit segment; and
   (b) a second signal having an edge at a position of (n−1)/n from the beginning of a unit segment, wherein:
      (i) n is an integer greater than or equal to three; and
      (ii) one of the first signal and the second signal representing logic "0" and the other representing logic "1";
causing the receiver to detect a reception interval based on;
   (a) said edge at the position that is 1/n from the beginning of the unit segment; and
   (b) said edge at the position of (n−1/n from the beginning of the unit segment; causing the receiver to determine whether the reception interval is;
   (a) a start signal interval by determining whether the reception interval includes any of a first set of a first plurality of lengths;
   (b) a data end interval by determining whether the reception interval includes any of a second set of a second plurality of lengths, wherein each of said lengths of the second set are different from each of the lengths of the first set;
causing the receiver to set:
   (a) a first logic by determining whether the reception interval includes a third length, wherein said third length is different from:
      (i) each of the lengths of the first set; and
      (ii) each of the lengths of the second set; and
   (b) a second different logic by determining whether the reception interval includes a fourth length, wherein said fourth length is different from:
      (i) each of the lengths of the first set;
      (ii) each of the lengths of the second set; and
      (iii) said third length.

5. The signal transmitting/receiving method of claim 4, which includes determining, by the receiver, a signal type based on a length of an edge interval of rising edges of the signals received.

6. The signal transmitting/receiving method of claim 4, which includes determining, by the receiver, a signal type based on a length of an edge interval of falling edges of the signals received.

7. A signal transmitting apparatus comprising:
generating means for generating data to transmit;
modulating means for modulating a carrier based on the data generated; and
transmitting means for transmitting the carrier modulated;
wherein the generating means generates the data using:
   (a) a first signal having an edge at a position that is 1/n from the beginning of a unit segment; and
   (b) a second signal having an edge at a position of (n−1)/n from the beginning of a unit segment, wherein:
      (i) n is an integer greater than or equal to three; and
      (ii) one of the first signal and the second signal representing logic "0" and the other representing logic "1",
wherein said edge at the position that is 1/n from the beginning of the unit segment; and
said edge at the position of (n−1)/n from the beginning of the unit segment are utilized by a receiver to detect a reception interval, wherein said receiver:

(a) determines whether the reception interval is a start signal interval by determining whether the reception interval includes any of a first set of a first plurality of lengths;

(b) determines whether the reception interval is a data end interval by determining whether the reception interval includes any of a second set of a second plurality of lengths, wherein each of said lengths of the second set are different from each of the lengths of the first set;

(c) sets a first logic by determining whether the reception interval includes a third length, wherein said third length is different from:
  (i) each of the lengths of the first set; and
  (ii) each of the lengths of the second set; and (d) sets a second different logic by determining whether the reception interval includes a fourth length, wherein said fourth length is different from:
  (i) each of the lengths of the first set;
  (ii) each of the lengths of the second set; and
  (iii) said third length.

8. The signal transmitting apparatus according to claim 7, wherein the generating means generates a signal having substantially twice a length of one unit segment as a start signal, and a signal having substantially three times the length of one unit segment as an end signal.

9. The signal transmitting apparatus according to claim 7, wherein the generating means generates the same data an odd number of times in a predetermined command segment, the odd number of times being not less than three times.

10. The signal transmitting apparatus according to claim 7, wherein the modulating means outputs the carrier during periods of a first level while not outputting the carrier during periods of a second level.

11. The signal transmitting apparatus according to claim 7, wherein the transmitting means transmits the carrier as an infrared signal for remote-controlling an electronic apparatus.

12. A signal transmitting method performed by a signal transmitting apparatus, the method comprising the steps of:
generating data to transmit;
modulating a carrier based on the data generated; and
transmitting the carrier modulated;
wherein the generating step generates the data using:
  (a) a first signal having an edge at a position that is $1/n$ from the beginning of a unit segment; and
  (b) a second signal having an edge at a position of $(n-1)/n$ from the beginning of a unit segment, wherein:
    (i) n is an integer greater than or equal to three; and
    (ii) one of the first signal and the second signal representing logic "0" and the other representing logic "1"
wherein said edge at the position that is $1/n$ from the beginning of the unit segment; and said edge at the position of $(n-1)/n$ from the beginning of the unit segment are utilized by a receiver to detect a reception interval, wherein said receiver:
  (a) determines whether the reception interval is a start signal interval by determining whether the reception interval includes any of a first set of a first plurality of lengths;
  (b) determines whether the reception interval is a data end interval by determining whether the reception interval includes any of a second set of a second plurality of lengths, wherein each of said lengths of the second set are different from each of the lengths of the first set;
  (c) sets a first logic by determining whether the reception interval includes a third length, wherein said third length is different from:
    (i) each of the lengths of the first set; and
    (ii) each of the lengths of the second set; and
  (d) sets a second different logic by determining whether the reception interval includes a fourth length, wherein said fourth length is different from:
    (i) each of the lengths of the first set;
    (ii) each of the lengths of the second set; and
    (iii) said third length.

13. A recording medium having recorded thereon a computer-readable program, the program comprising the steps of:
generating data to transmit;
modulating a carrier based on the data generated; and
transmitting the carrier modulated;
wherein the generating step generates the data using:
  (a) a first signal having an edge at a position that is $1/n$ from the beginning of a unit segment; and
  (b) a second signal having an edge at a position of $(n-1)/n$ from the beginning of a unit segment, wherein:
    (i) n is an integer greater than or equal to three; and
    (ii) one of the first signal and the second signal representing logic "0" and the other representing logic "1"
wherein said edge at the position that is $1/n$ from the beginning of the unit segment; and said edge at the position of $(n-1/n$ from the beginning of the unit segment are utilized by a receiver to detect a reception interval, wherein said receiver:
  (a) determines whether the reception interval is a start signal interval by determining whether the reception interval includes any of a first set of a first plurality of lengths;
  (b) determines whether the reception interval is a data end interval by determining whether the reception interval includes any of a second set of a second plurality of lengths, wherein each of said lengths of the second set are different from each of the lengths of the first set;
  (c) sets a first logic by determining whether the reception interval includes a third length, wherein said third length is different from:
    (i) each of the lengths of the first set; and
    (ii) each of the lengths of the second set; and
  (d) sets a second different logic by determining whether the reception interval includes a fourth length, wherein said fourth length is different from:
    (i) each of the lengths of the first set;
    (ii) each of the lengths of the second set; and
    (iii) said third length.

14. A computer program product embodied in a computer readable medium storing a program comprising the steps of:
generating data to transmit;
modulating a carrier based on the data generated; and
transmitting the carrier modulated;
wherein the generating step generates the data using:
  (a) a first signal having an edge at a position that is $1/n$ from the beginning of a unit segment; and
  (b) a second signal having an edge at a position of $(n-1)/n$ from the beginning of a unit segment, wherein:
    (i) n is an integer greater than or equal to three; and (ii) one of the first signal and the second signal representing logic "0" and the other representing logic "1";

wherein said edge at the position that is 1/n from the beginning of the unit segment; and said edge at the position of (n−1)/n from the beginning of the unit segment are utilized by a receiver to detect a reception interval, wherein said receiver:

(a) determines whether the reception interval is a start signal interval by determining whether the reception interval includes any of a first set of a first plurality of lengths;

(b) determines whether the reception interval is a data end interval by determining whether the reception interval includes any of a second set of a second plurality of lengths, wherein each of said lengths of the second set are different from each of the lengths of the first set;

(c) sets a first logic by determining whether the reception interval includes a third length, wherein said third length is different from:
(i) each of the lengths of the first set; and
(ii) each of the lengths of the second set; and (d) sets a second different logic by determining whether the reception interval includes a fourth length, wherein said fourth length is different from:
(i) each of the lengths of the first set;
(ii) each of the lengths of the second set; and
(iii) said third length.

15. A signal processing apparatus comprising:
obtaining means for obtaining signals;
edge detecting means for detecting edges of the signals obtained,
wherein the edge detecting means detects any one of edges of transition from a first level to a second level and edges of transition from the second level to the first level in signals composed of:
(a) a first data signal having an edge at a position that is 1/n from a beginning of a unit segment; and
(b) a second data signal having an edge at a position of (n−1)/n from the beginning of a unit segment, where n is an integer greater than or equal to three;
interval detecting means for detecting an edge interval corresponding to a reception interval between either rising edges or falling edges detected;
length determining means for determining a length of the edge interval detected; and
a first detector which determines whether the reception interval is a start signal interval by determining whether the reception interval includes any of a first set of a first plurality of lengths;
a second detector which determines whether the reception interval is a data end interval by determining whether the reception interval includes any of a second set of a second plurality of lengths, wherein each of said lengths of the second set are different from each of the lengths of the first set;
a setter which sets:
(a) a first logic by determining whether the reception interval includes a third length, wherein said third length is different from:
(i) each of the lengths of the first set; and
(ii) each of the lengths of the second set;
(b) a second different logic by determining whether the reception interval includes a fourth length, wherein said fourth length is different from:
(i) each of the lengths of the first set;
(ii) each of the lengths of the second set; and
(iii) said third length.

16. The signal processing apparatus according to claim 15, wherein the type determining means determines a start signal and a type of a data signal immediately succeeding the start signal based on the length of the edge interval.

17. The signal processing apparatus according to claim 15, wherein the type determining means determines a type of a next data signal based on the length of the edge interval and a type of a data signal immediately preceding the edge interval.

18. The signal processing apparatus according to claim 15, wherein the type determining means determines an end signal and a type of a data signal immediately preceding the end signal based on the length of the edge interval and a type of a data signal immediately preceding the edge interval.

19. The signal processing apparatus according to claim 15, further comprising:
receiving means for receiving infrared signals transmitted for remote control; and
processing means for executing processing corresponding to the signal type determined;
wherein the obtaining means obtains signals that are based on the infrared signals received by the receiving means.

20. The signal processing apparatus according to claim 19, wherein the receiving means receives infrared signals for remote-controlling display on a plasma display, and
wherein the processing means controls the display on the plasma display.

21. The signal processing apparatus of claim 15, wherein the interval detecting means detects an edge interval corresponding to an interval between rising edges detected.

22. The signal processing apparatus of claim 15, wherein the interval detecting means detects an edge interval corresponding to an interval between falling edges detected.

23. A signal processing method performed by a signal processing apparatus, the method comprising the steps of:
obtaining signals;
detecting edges of the signals obtained,
wherein the detected edges are any one of edges of transition from a first level to a second level and edges of transition from the second level to the first level in signals composed of:
(a) a first data signal having an edge at a position that is 1/n from a beginning of a unit segment; and
(b) a second data signal having an edge at a position of (n−1)/n from the beginning of a unit segment, where n is an integer greater than or equal to three;
detecting an edge interval corresponding to a reception interval between either rising edges or falling edges detected;
determining a length of the edge interval detected; and
causing a first detector to determine whether the reception interval is a start signal interval by determining whether the reception interval includes any of a first set of a first plurality of lengths;
causing a second detector to determine whether the reception interval is a data end interval by determining whether the reception interval includes any of a second set of a second plurality of lengths, wherein each of said lengths of the second set are different from each of the lengths of the first set;
causing a setter to set:

(a) a first logic by determining whether the reception interval includes a third length, wherein said third length is different from:
  (i) each of the lengths of the first set; and
  (ii) each of the lengths of the second set;
(b) a second different logic by determining whether the reception interval includes a fourth length, wherein said fourth length is different from:
  (i) each of the lengths of the first set;
  (ii) each of the lengths of the second set; and
  (iii) said third length.

24. The signal processing method of claim 23, which includes detecting an edge interval corresponding to an interval between rising edges detected.

25. The signal processing method of claim 23, which includes detecting an edge interval corresponding to an interval between falling edges detected.

26. A recording medium having recorded thereon a computer-readable program, the program comprising the steps of:
obtaining signals;
detecting edges of the signals obtained,
wherein the detected edges are any one of edges of transition from a first level to a second level and edges of transition from the second level to the first level in signals composed of:
  (a) a first data signal having an edge at a position that is 1/n from a beginning of a unit segment; and
  (b) a second data signal having an edge at a position of (n−1)/n from the beginning of a unit segment, where n is an integer greater than or equal to three
detecting an edge interval corresponding to a reception interval between either rising edges or falling edges detected;
determining a length of the edge interval detected; and
determining whether the reception interval is a start signal interval by determining whether the reception interval includes any of a first set of a first plurality of lengths;
determining whether the reception interval is a data end interval by determining whether the reception interval includes any of a second set of a second plurality of lengths, wherein each of said lengths of the second set are different from each of the lengths of the first set;
setting:
  (a) a first logic by determining whether the reception interval includes a third length, wherein said third length is different from:
    (i) each of the lengths of the first set; and
    (ii) each of the lengths of the second set;
  (b) a second different logic by determining whether the reception interval includes a fourth length, wherein said fourth length is different from:
    (i) each of the lengths of the first set;
    (ii) each of the lengths of the second set; and
    (iii) said third length.

27. The recording medium of claim 26, wherein the program includes the step of detecting an edge interval corresponding to an interval between rising edges detected.

28. The recording medium of claim 26, wherein the program includes the step of detecting an edge interval corresponding to an interval between falling edges detected.

29. A computer program product embodied in a computer readable medium storing a program comprising the steps of:
obtaining signals;
detecting edges of the signals obtained,
wherein the detected edges are any one of edges of transition from a first level to a second level and edges of transition from the second level to the first level in signals composed of:
  (a) a first data signal having an edge at a position that is 1/n from a beginning of a unit segment; and
  (b) a second data signal having an edge at a position of (n−1)/n from the beginning of a unit segment, where n is an integer greater than or equal to three;
detecting an edge interval corresponding to a reception interval between either rising edges or falling edges detected;
determining a length of the edge interval detected; and
determining whether the reception interval is a start signal interval by determining whether the reception interval includes any of a first set of a first plurality of lengths;
determining whether the reception interval is a data end interval by determining whether the reception interval includes any of a second set of a second plurality of lengths, wherein each of said lengths of the second set are different from each of the lengths of the first set;
setting:
  (a) a first logic by determining whether the reception interval includes a third length, wherein said third length is different from:
    (i) each of the lengths of the first set; and
    (ii) each of the lengths of the second set;
  (b) a second different logic by determining whether the reception interval includes a fourth length, wherein said fourth length is different from:
    (i) each of the lengths of the first set;
    (ii) each of the lengths of the second set; and
    (iii) said third length.

30. The computer program product of claim 29, wherein the program includes the step of detecting an edge interval corresponding to an interval between rising edges detected.

31. The computer program product of claim 29, wherein the program includes the step of detecting an edge interval corresponding to an interval between falling edges detected.

32. A signal transmitting apparatus comprising:
a generator configured to generate data to transmit;
a modulator configured to modulate a carrier based on the data generated; and
a transmitter configured to transmit the carrier modulated;
wherein the generator generates the data using:
  (a) a first signal having an edge at a position that is 1/n from the beginning of a unit segment; and
  (b) a second signal having an edge at a position of (n−1)/n from the beginning of a unit segment, wherein:
    (i) n is an integer greater than or equal to three; and
    (ii) one of the first signal and the second signal representing logic "0" and the other representing logic "1";
wherein said edge at the position that is 1/n from the beginning of the unit segment; and said edge at the position of (n−1)/n from the beginning of the unit segment are utilized by a receiver to detect a reception interval, wherein said receiver:
  (a) determines whether the reception interval is a start signal interval by determining whether the reception interval includes any of a first set of a first plurality of lengths;
  (b) determines whether the reception interval is a data end interval by determining whether the reception interval includes any of a second set of a second plurality of lengths, wherein each of said lengths of the second set are different from each of the lengths of the first set;
(c) sets a first logic by determining whether the reception interval includes a third length, wherein said third length is different from:
  (i) each of the lengths of the first set; and
  (ii) each of the lengths of the second set; and
(d) sets a second different logic by determining whether the reception interval includes a fourth length, wherein said fourth length is different from:
  (i) each of the lengths of the first set;
  (ii) each of the lengths of the second set; and
  (iii) said third length.

33. A signal processing apparatus comprising:
an obtaining unit configured to obtain signals;
an edge detector configured to detect edges of the signals obtained,
wherein the edge detector detects any one of edges of transition from a first level to a second level and edges of transition from the second level to the first level in signals composed of:
  (a) a first data signal having an edge at a position that is 1/n from a beginning of a unit segment; and
  (b) a second data signal having an edge at a position of (n−1)/n from the beginning of a unit segment, where n is an integer greater than or equal to three;
an interval detector configured to detect an edge interval corresponding to an interval between either rising edges or falling edged detected;
a length determining unit configured to determine a length of the edge interval detected; and
a first detector which determines whether the reception interval is a start signal interval by determining whether the reception interval includes any of a first set of a first plurality of lengths;
a second detector which determines whether the reception interval is a data end interval by determining whether the reception interval includes any of a second set of a second plurality of lengths, wherein each of said lengths of the second set are different from each of the lengths of the first set;
a setter which sets:
  (a) a first logic by determining whether the reception interval includes a third length, wherein said third length is different from:
    (i) each of the lengths of the first set; and
    (ii) each of the lengths of the second set;
  (b) a second different logic by determining whether the reception interval includes a fourth length, wherein said fourth length is different from:
    (i) each of the lengths of the first set;
    (ii) each of the lengths of the second set; and
    (iii) said third length.

34. The signal processing apparatus of claim 33, wherein the interval detector is configured to detect an edge interval corresponding to an interval between rising edges detected.

35. The signal processing apparatus of claim 33, wherein the interval detector is configured to detect an edge interval corresponding to an interval between falling edges detected.

* * * * *